(12) United States Patent
Zabrovarnyy

(10) Patent No.: US 8,869,101 B2
(45) Date of Patent: Oct. 21, 2014

(54) AUTOMATED IMPLEMENTATION OF BUSINESS SERVICE COMMUNICATION AND/OR LINKAGE OF EXECUTABLE PROCESSES THROUGH AUTOMATIC GENERATION AND POPULATION OF VARIABLES

(75) Inventor: Yuriy Zabrovarnyy, Lviv-Rudno (UA)

(73) Assignee: Software AG, Darmstadt (DE)

( * ) Notice: Subject to any disclaimer, the term of this patent is extended or adjusted under 35 U.S.C. 154(b) by 169 days.

(21) Appl. No.: 13/307,921

(22) Filed: Nov. 30, 2011

(65) Prior Publication Data

US 2013/0138575 A1    May 30, 2013

(51) Int. Cl.
*G06Q 10/06* (2012.01)
(52) U.S. Cl.
USPC ............................. 717/105; 717/106; 717/143
(58) Field of Classification Search
CPC ........................................................ G06F 8/10
USPC .......................................................... 717/105
See application file for complete search history.

(56) References Cited

U.S. PATENT DOCUMENTS

| 2009/0031280 A1* | 1/2009 | Koehler ........................ 717/104 |
| 2009/0172691 A1* | 7/2009 | Barros et al. .................. 718/104 |
| 2009/0265684 A1* | 10/2009 | Fuchs et al. ................... 717/105 |

OTHER PUBLICATIONS

Software AG. ARIS SOA Architect—Fact Sheet. [online] [retrieved Nov. 30, 2011 ] http://www.softwareamcom/comorate/ima~es/SAG ARIS SOA-Arch F S Oct10-web tcm16-78622.pdf.*
U.S. Appl. No. 13/280,960, filed Oct. 25, 2011; Göres et al.
U.S. Appl. No. 13/024,646, filed Feb. 10, 2011; Göres.
Software AG. ARIS Business Architect & Designer—Fact Sheet. [online] [retrieved Nov. 30, 2011] http://www.softwareag.com/corporate/images/SAG_ARIS_BusArchDesign_FS_Oct10-web_tcm16-78556.pdf.
Software AG. ARIS Process Governance—Fact Sheet. [online] [retrieved Nov. 30, 2011] http://www.softwareag.com/corporate/images/SAG_ARIS_ProcGov_FS_Oct10-web_tcm16-78586.pdf.
Software AG. ARIS SOA Architect—Fact Sheet. [online] [retrieved Nov. 30, 2011] http://www.softwareag.com/corporate/images/SAG_ARIS_SOA-Arch_FS_Oct10-web_tcm16-78622.pdf.

* cited by examiner

*Primary Examiner* — Wei Zhen
*Assistant Examiner* — Mohammed Huda
(74) *Attorney, Agent, or Firm* — Nixon & Vanderhye, P.C.

(57) ABSTRACT

Certain example embodiments described relate to the generation of variables for data flow chains that are associated with control flow models. Certain example embodiments relate to the creation of a diagram (e.g., an automation diagram) that encapsulates the flow of data in a process model (e.g., EPC). In certain example embodiments, the generation of variables provides for linking executable processes via the automation diagram so that the data flow may be integrated into the EPC model. An EPC model may be transformed into a BPMN model. Optionally, the transformations may occur in reverse so that an automation diagram is created from a modified EPC model.

35 Claims, 27 Drawing Sheets

AUTOMATED IMPLEMENTATION OF BUSINESS SERVICE COMMUNICATION AND/OR LINKAGE OF EXECUTABLE PROCESSES THROUGH AUTOMATIC GENERATION AND POPULATION OF VARIABLES

FIELD OF THE INVENTION

Certain example embodiments described herein relate to the generation of variables for data flow chains that are associated with control flow models. Certain example embodiments herein also relate to the creation of a diagram (e.g., an automation diagram) that encapsulates the flow of data of a process model (e.g., an EPC model). In certain example embodiments, the generation of variables provides for linking executable processes via the automation diagram so that the data flow may be integrated into the EPC model. Further, in certain example embodiments the integrated EPC model may be transformed into a BPMN model. Optionally, the transformations may occur in reverse so that an automation model is created from a modified EPC model.

BACKGROUND AND SUMMARY OF EXAMPLE EMBODIMENTS OF THE INVENTION

Businesses can have large, complex processes that sometimes require input from different people, departments, or even companies before a given process is considered "completed." For example, processing an order for a production line could possibly involve input from a purchasing department (purchase raw materials), a design team (to design the product), the assembly department (make the product), a quality control team (test the product), a sales department (to sell what is produced), etc. Each of these teams may have many different subtasks to be completed for the process as a whole to move forward. Manually checking a process through a check list, verbal communication, or the like is generally inefficient and increases the likelihood of errors in work flow (e.g., because the defined process is not conformed to). One technique that companies can use to increase the efficiency of executing a process includes implementing business process automation, e.g., by describing the process in terms of a business process model. Of course it will be appreciated that the present invention is not limited to business process modeling, but may well be used in other scenarios, such as the systems engineering of complex technical products. For example, the development process of a vehicle is nowadays largely model-based. In such a scenario, various vehicle components may be modeled on a system-wide level defining the main mechanical components (e.g., chassis, engine, power train, etc.) as well as electric/electronic components (e.g., rain sensors, speed-limiters, embedded processors, and the related software). Further, the individual vehicle components are themselves defined by more and more concrete technical models as the development process continues, ultimately leading to a variety of technical component models on different levels of abstraction, but yet interrelated. Other technical applications of certain example embodiments may include, for example, technical manufacturing processes or processes that define a flow of steps to be performed by technical equipment, such as robotized automation equipment for conducting a manufacturing process.

Processes can be modeled in various notations—one of the most popular ones is Business Process Model and Notation (BPMN). BPMN is more or less technical and can be transformed into an executable format and executed by, for example, an ARIS (Architecture of Integrated Information Systems) Process Governance (APG) server that may be available from the assignee of the instant application. Another type of notation is called EPC (Event-Driven Process Chain). In certain respects this notation may be easier and/or more intuitive for certain types of users. For example, a business end user (e.g., a non-technical user) may be more comfortable designing a process in EPC as compared to BPMN. However, BPMN may be preferred for when the business process is executed/deployed. One way to provide both functionalities is to provide automatic transforms where EPC models may be transformed into BPMN models (and vice versa). Such transformations may be described in U.S. Publication No. 2009/0265684 and U.S. application Ser. Nos. 13/280,960 and 13/024,646, the entire contents of each which are hereby incorporated by reference. Accordingly, users may design models in EPC and provide the EPC notation to a system that transforms the EPC to BPMN (e.g., via a transformation such as EPC2BPMN). The resulting transform may then be passed to an ARIS process governance (APG) server that executes BPMN.

However, EPC is not without its downsides. For example, while EPC may be easier for certain users to operate in, it can become unwieldy because of the complexity and/or size of the process that is being modeled (e.g., as hundreds of steps may be involved in the process model for a moderately complex environment).

One technique for addressing the "too fine" granularity offered by EPC is to implement new levels of abstraction that allow designing processes by blocks instead of using single executable elements. However, this technique can have downsides. For example, the new level of abstraction can increase the complexity of the model such that it may become increasingly difficult (or in certain cases impossible) to transfer data between the different business services, which may themselves be executable processes. Moreover, this type of approach may not support the modularity of services in question but instead may require the review of the whole executable process after each change in data flow. As will be appreciated, this may potentially reduce the effectiveness of the initially provided abstraction.

An example of this issue is shown in FIG. 32. More specifically, diagram 3200 includes multiple large EPC models with their respective quite large and the individual elements. However, the individual elements are small and difficult to read. Further, if a user zooms too far in, the user may become lost and unable to grasp the purpose or "bigger picture" of the process being modeled. Moreover, simply zooming out (as shown in FIG. 32) does not provide a very good high level view in which the user can assess the purpose of the process. As explained above, one way to address this is to add a new layer of abstraction.

Thus, FIG. 32 also includes an abstraction layer that is used to hide the complexity. This is done through the use of a Value-Added Chain Diagram (VACD) 3202. The EPC models in the diagram 3200 are assigned to each chain, and the control flow is passed (e.g., the arrows in diagram 3200) via special event objects (process interfaces at the end/beginning of each model).

One issue with the VACD diagram approach is that it may not be possible to control or model the data flow within the EPC diagrams for each chain in some cases. This issue is shown in FIG. 33 where the VACD diagram does not "know" about the data flow dependencies (represented by the arrows in FIG. 33) from the EPC diagram.

In certain instances, problems may result from such an implementation. For example, if an activity fails during process execution on the server, the failure may not mean that the problem exists in the EPC model where the "problem" activity object is located. Instead, the problem may be in another EPC model that has propagated the problem up/down the chain of execution. Moreover, it may be not always be feasible to provide a workable chain (backed by an EPC model) because it may contain references to dataflow in another EPC. Further, it may not be possible to test each chain separately, and instead, the entire process may need to be tested. This lack of component testing may lead to long design and/or testing times for process development.

Thus, it will be appreciated that there is a need in the art for improved techniques of modeling business processes through various notation schemes such as, for example, EPC, BPMN, and the like. The problem of correct transition between different model levels is similarly severe in the above-mentioned systems engineering context. For example, strong interrelations may exist between the lower-abstraction (e.g., fine-grained) technical models of the vehicle components of an automobile and the higher-abstraction (e.g., more coarse-grained) component or overall vehicle models. This is because the vehicle components typically have multiple interaction points on the higher abstraction level that are reflected correctly in the lower-level models and vice versa—an example of which is an optical or radar-based distance sensor component that may be shared by both a software-based speed-limiter and an emergency breaking component. Such interrelations, as well as other feature interactions, can make the correct and consistent transition of model elements between different model levels more difficult.

Accordingly, in certain example embodiments, techniques (e.g., algorithms) for variable generation and population are provided. The generation and population of such variables may work and/or be provided by an "Automation diagram." In certain example embodiments, the diagram may provide communication between independent executable blocks and/or may control dependencies between the blocks. In certain example embodiments, an automated implementation may be provided that interfaces between the different "blocks" (e.g., that may be complex business services) through automatic generation of atomic operations and linkage between the services via variables that are automatically created and/or filled with corresponding values.

Certain example embodiments may provide one or more of the following and/or other advantages:

Workable executable blocks of a process;

Modular business services that are "ready to run;"

Reduction in time and effort on debugging and testing of such processes; and

Simplification of process design and/or clear implementation for a user.

In certain example embodiments, a system for providing an automation diagram may be provided. In certain example embodiments, the generation of an automation diagram is done independently of the creation of an EPC model. In other words, automation diagrams may not be generated from the EPC model. In certain example embodiments, a data flow between automation chains may be generated automatically.

In certain example embodiments, a method of linking executable process to one another is provided. A base control flow model is provided that includes a plurality of components, with at least some of the components include one or more data fields. An automation model is provided that includes a plurality of blocks, with each said block being associated with a partial subset of the base control flow model and including indication(s) of data field(s) associated with the respective partial subset of the base control flow model. Relationships are defined between at least some of the indications of the data fields in the blocks of the automation model. A request to transform the base control flow model to a transformed control flow model is responded to by, for each block in the automation model: determining which indication(s) of the data field(s) in the block is/are output(s) for the block; determining, for each said output, a corresponding input for another one of said blocks; generating a new component in the transformed control flow model; creating a variable for the new component for each output for the block and for each input to the another one of said blocks; associating the created variables with one another to indicate a connection therebetween in accordance with the defined relationships represented in the automation model; and injecting the new component into the partial subset associated with the block.

In certain example embodiments, a system for linking executable processes to one another is provided. A storage medium is configured to store a base control flow model that includes a plurality of components, at least some of the components including one or more data fields. The storage medium is also configured to store an automation model that includes a plurality of blocks, each said block being associated with a partial subset of the base control flow model and including indication(s) of data field(s) associated with the respective partial subset of the base control flow model, wherein relationships are defined between at least some of the indications of the data fields in the blocks of the automation model. The system includes a processing system with at least one processor. The processing system is configured to respond to a request to transform the base control flow model to a transformed control flow model by, for each block in the automation model: determine which indication(s) of the data field(s) in the block is/are output(s) for the block; determine, for each said output, a corresponding input for another one of said blocks; generate a new component in the transformed control flow model; create a variable for the new component for each output for the block and for each input to the another one of said blocks; associate the created variables with one another to indicate a connection therebetween in accordance with the defined relationships represented in the automation model; and inject the new component into the partial subset associated with the block.

In certain example embodiments, a computer implemented method of linking segments of a base control flow process model that includes a plurality of components divided among the segments is provided. At least some of the plurality of components include one or more data fields. The segments include first and second segments which include first and second components, respectively and the first and second components include first and second data fields. A base automation model is created that includes a plurality of blocks, the plurality of blocks including at least a first block and a second block. A plurality of relationships is defined among the plurality of blocks of the base automation model, the defined plurality of relationships including a first relationship between the first block and the second block. The base automation model is associated with the base control flow process model to create a combined model including: associating each one of the segments of the base control flow model with a respective one of the plurality of blocks of the base automation model, the first and second segments associated, respectively, with the first and second blocks; and assigning at least some data fields of the at least some plurality of components respective components to the plurality of relationships, including assigning the first data field to the first relationship and assigning the second data field to the first relationship.

In certain example embodiments, a computer-implemented method of linking executable processes to one another is provided. A base control flow model is provided that includes a plurality of components, at least some of the components including one or more data fields. An automation model is provided that includes a plurality of blocks, each said block being associated with a partial subset of the base control flow model and including indication(s) of data field(s) associated with the respective partial subset of the base control flow model, wherein relationships are defined between at least some of the indications of the data fields in the blocks of the automation model. Responding to a request to transform the base control flow model to a transformed control flow model by, for at least one of the blocks in the automation model: a new component is generated in the transformed control flow model; and an anchor is created for the new component in accordance with the defined relationships represented in the automation model.

In certain example embodiments, generated variables may be linked to thereby define a data flow. Additionally, or alternatively, in certain example embodiments, processes or events may be linked. Accordingly, a link may be created between a created anchor in one component and a created anchor in another component.

Non-transitory computer readable storage mediums tangibly storing instructions for performing the above-summarized and/or other methods also are provided by certain example embodiments, as well as corresponding computer programs.

Certain example embodiments may include systems configured to implement out one or more of the above-summarized and/or other methods also are provided by certain example embodiments.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

In conventional applications, business process notations are concerned with expressing a "control flow". For example, the director of finance approves a purchase, which may then trigger a further event in which the Chief Financial Officer of the company must approve a purchase (e.g., if the purchase is above a certain dollar amount). In other words, a series of events are triggered. Monitoring (or viewing) the flow of these events is one of the features of business process models. Users can see the flow from event-to-event. As noted above, business process models may be expressed in EPC notation. Such a created EPC model may be transformed into BPMN (e.g., a more technical notation) and then eventually executed/deployed for use. However, these notations may do a comparatively poor job of showing the underlying data flows among and/or between the defined business process models.

Thus, certain example embodiments provide a "data flow" view that may represent a data flow for a given control flow (e.g., a more conventional EPC model). In certain example embodiments, an exemplary data flow view/diagram/model may be created automatically from a given traditional business process model. In certain example embodiments, a user interface may be provided to facilitate the creation of a data flow view/diagram/model. In other words, the user of the system may create the data flow and then assign values or links between the various data views that are associated with a given business process model. In certain example embodiments, data flow models may be created with input from both automated and manual tasks. For example, data fields associated with a given model may be extracted to form an initial data view. A user may then associate the data fields amongst the various data views to create a visible "flow" of the data.

Figure 1A:
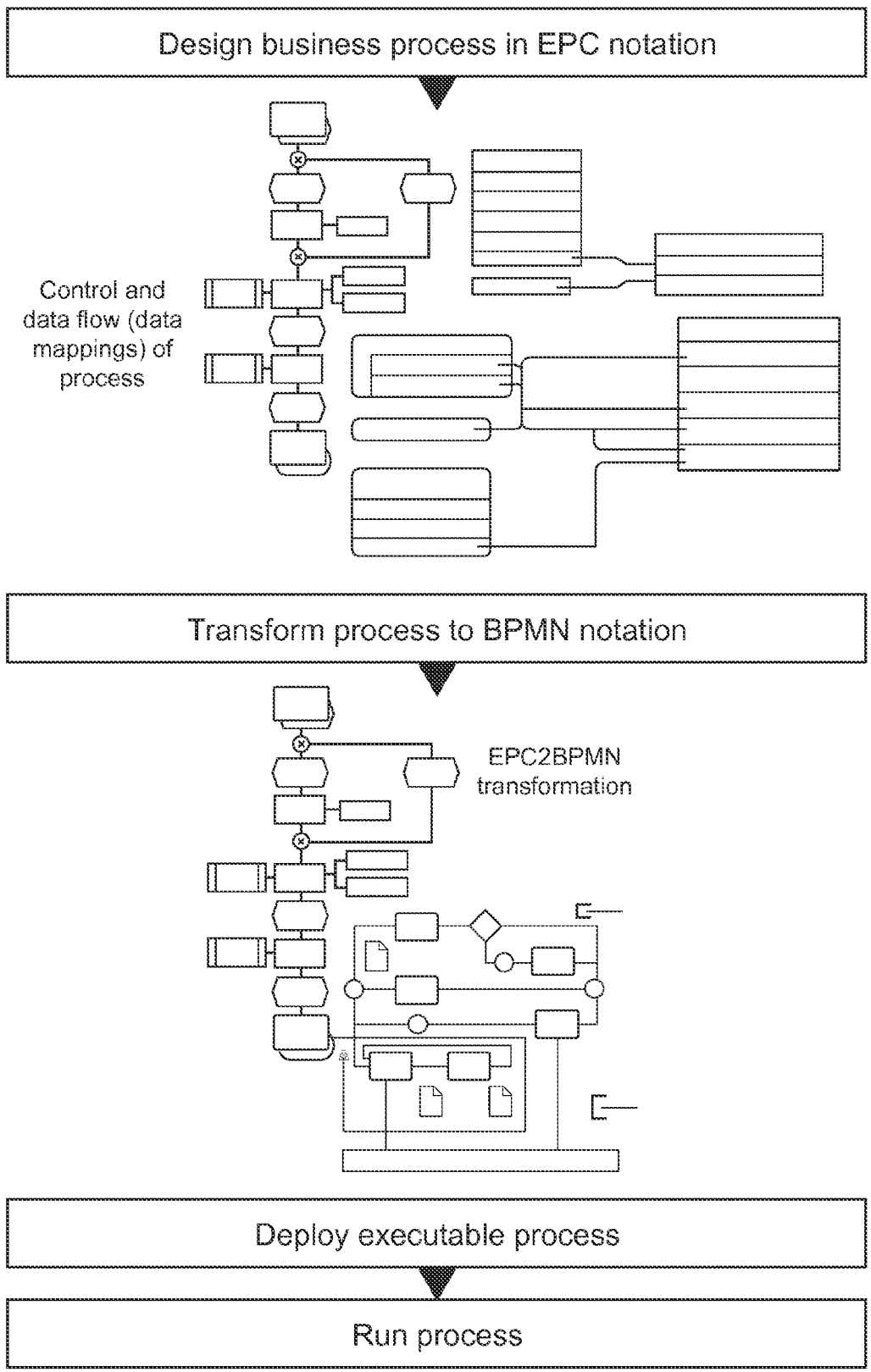
FIG. 1A is an illustration of an example EPC to BPMN transformation that includes control and data flow processing according to certain example embodiments.

As noted above, EPC notation may be a more "user friendly" modeling language for business users. However, in certain instances it may be desirable to create a more technical description (e.g., BPMN) of the business process modeled in EPC notation (or another business-oriented process description). FIG. 1A is an illustration of an example EPC to BPMN transformation that includes control and data flow processing according to certain example embodiments. Here, a user (e.g., a business user) initially designs a business process in EPC notation. For example, the business process may be an order fulfillment business process. In addition to the control flow of the process, the user may also include a data flow that describes how the data flows between the various models or processes. At a certain point, the user may transform (e.g., via a transformation process) the business process model (e.g., set forth in EPC notation) into a more technical process description (e.g., in BPMN). For example, the transformation may be an EPC2BPMN transformation such as is described in U.S. application Ser. No. 13/280,960, the entire contents of which are hereby incorporated by reference. Once deployed, the process may be run/executed so that the designed order fulfillment process may be used by, for example, the sales team of a company.

Figure 1B:
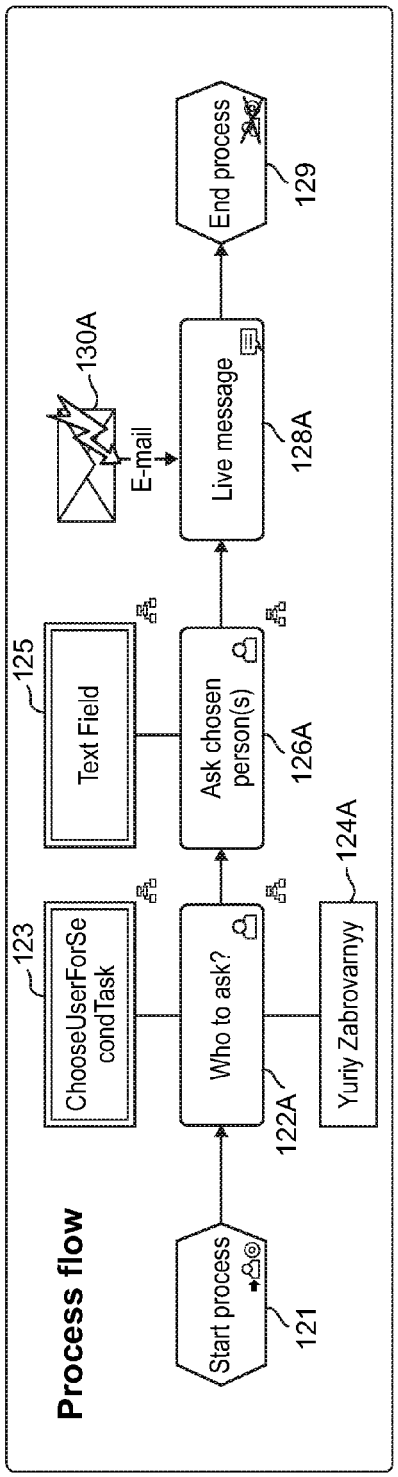
FIG. 1B is a process flow diagram according to certain example embodiments.
Figure 1C:
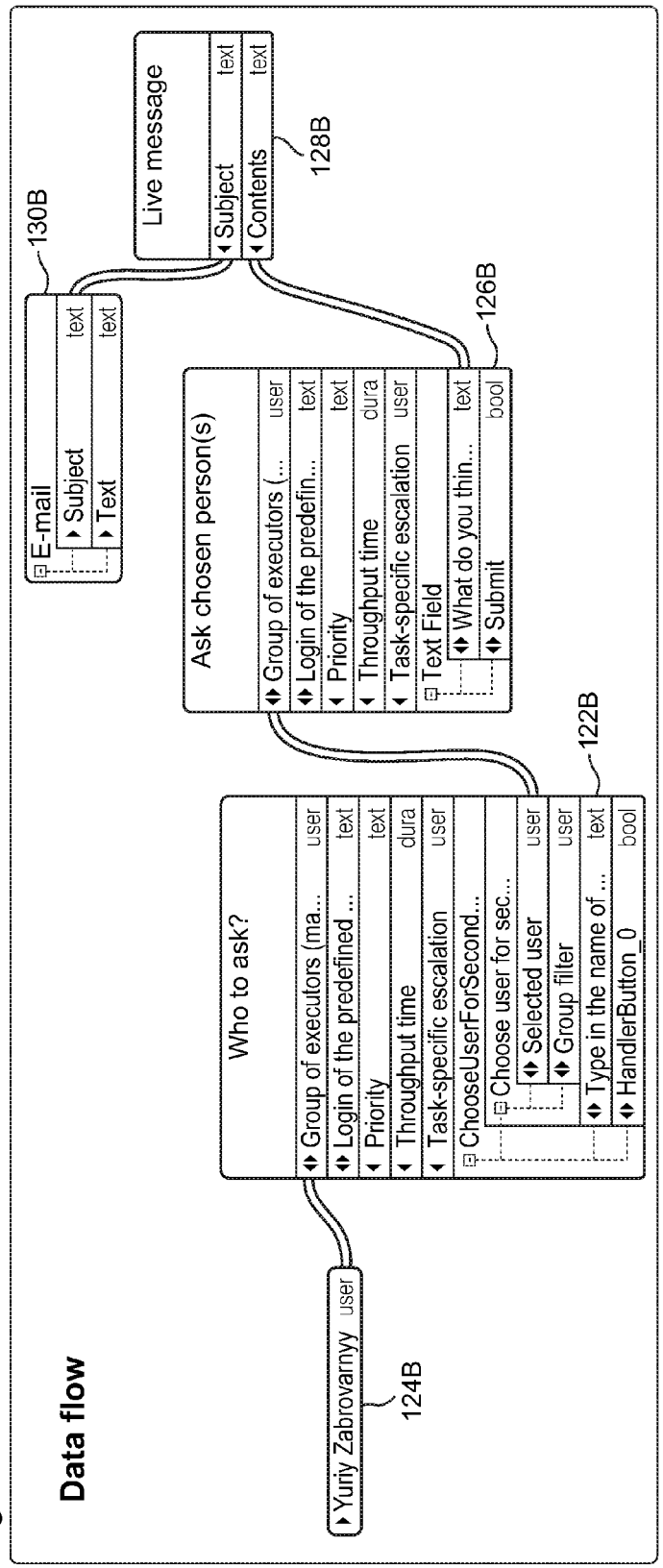
FIG. 1C is an example data flow diagram that corresponds to the process flow in FIG. 1B.

FIGS. 1B and 1C provide a more detailed view of what a user initially creates. FIG. 1B is a process flow diagram showing an example business process according to certain example embodiments, and FIG. 1C is an example data flow diagram that corresponds to the process flow in FIG. 1B. Here, the business process starts at 121 and proceeds to the step of "Who to ask" 122A. This event includes inputs of Yuriy via the inputted field 124A and a directive to choose a second user via input field 123. Once the user is selected, a question is inputted through text field 125 of step 126A. Subsequently, the process proceeds to a live message step 128A when an email is generated/received at 130A. After the live message, the process ends at 129. The data flow diagram in FIG. 1C may be automatically generated to show the flow of data in relation to the process flow diagram of FIG. 1B. More specifically, each of steps 122A, 124A, and 126A, 128A, and 130A have respective data fields 122B, 124B, 126B, 128B, and 130B. The data flow diagram then maps how variable/parameter information moves between the various steps. Thus, for example, a user can determine that the live message uses the contents of the text field 125 from step 126A and the text from the subject field of the email 130A as input for the live message. In certain example embodiments, the data is extracted and a user assigns how the data flows.

Conventional process models (e.g., EPC models) can become too big to effectively maintain. Attempts to create further levels of abstraction (e.g., VACD) can break down as changes to the top level of abstraction may not effectively translate to lower level, more technical models. Accordingly, the inventors of the instant application have proposed an "automation diagram." In certain example embodiments, this diagram may add another layer of abstraction to a business process level (e.g., in EPC or other notation) with additional variable (or other entity—e.g., processes, events, etc) generation for chains that may be created based on this information.

Figure 2:
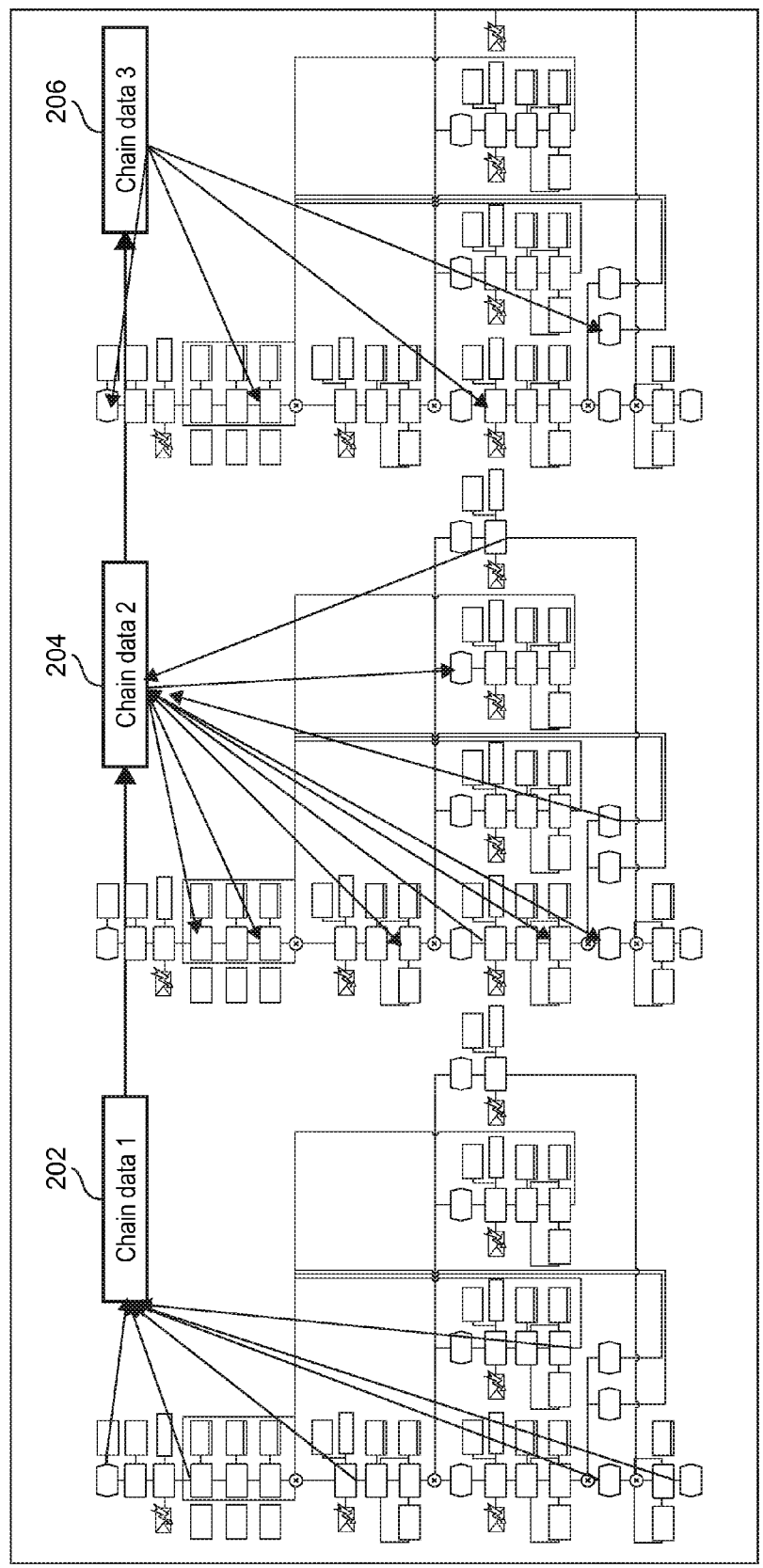
FIG. 2 is an example diagram showing communication between processes via chain data fields.

In certain example embodiments, communication in an automation diagram occurs between data fields of the chains for a diagram. Accordingly, in certain example embodiments, there may be no communication between executable process flow EPCs. FIG. 2 shows an example diagram where chain data 202, 204, and 206 may respectively include the data fields from the associated models. The transitions between the models are defined with respect to the data within the chains rather than the process flow of the associated EPC models.

Figure 3A:
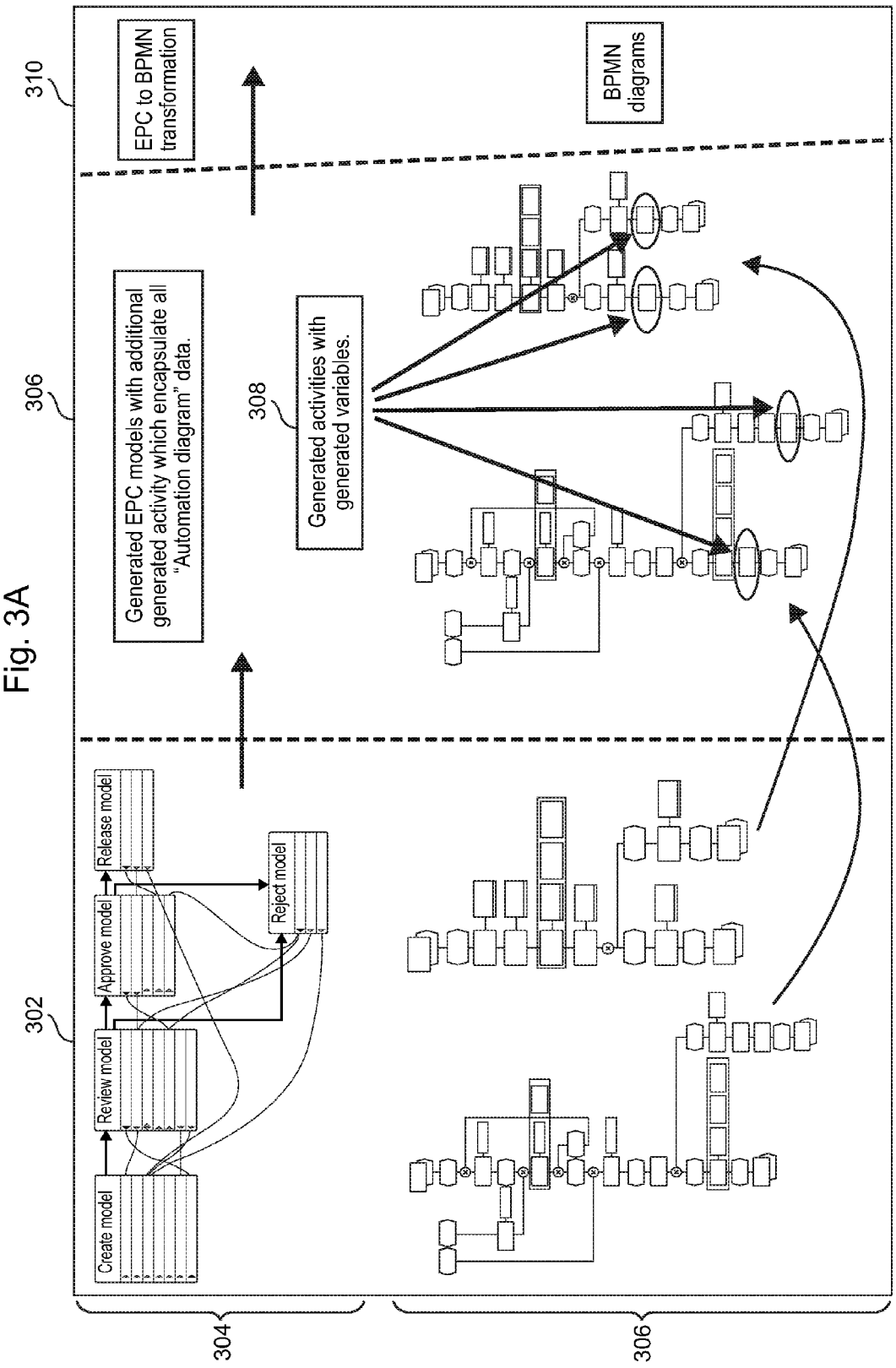
FIG. 3A is an illustration of an example EPC to EPC to BPMN transformation that includes an automation diagram according to certain example embodiments.

FIG. 3A is an illustration of an example EPC to EPC to BPMN transformation that includes an automation diagram according to certain example embodiments. Here, a first EPC model view 302 includes a traditional process flow diagram 306 and an automation diagram 304 (that is the same as the diagram shown in FIG. 3B). As discussed herein, the automation diagram may be generated automatically, manually, or a combination thereof to show the flow of data between the associated entities/models/etc. This diagram may be based on a given process model, such as, for example a process model that is described in EPC notation.

In certain example embodiments, the process flow diagram and automation diagram may be described in EPC notation. In certain example embodiments, the flow diagrams are defined in EPC notation and the automation diagrams are defined in an independent notation (e.g., separate from EPC). In any event, the diagrams may be transformed from their state in 302 to another EPC diagram shown in 306 (e.g., an EPC2EPC transform). The variables set forth in the data flow diagram 304 may be transformed into a generated "mapping" activity. Generated mapping activities 308 may then be injected or inserted into the process flow diagram in view 306. In certain example embodiments, the generated activity is placed before linking to another model (e.g., EPC model). This may be done, for example, with an event and a process interface object. In certain example embodiments, for each defined block-to-block communication, a mapping activity is generated and inserted. As noted above, in the 302 view the process control diagram is not linked in any explicit way. Thus, in certain example embodiments, the generated and inserted activities may facilitate linking business processes together, while still maintaining the data flow control diagram 304. In certain example embodiments, the generated variables may be located in a data flow diagram of the generated mapping activity. In certain example embodiments, the object type of the mapping activity may be "function."

Once the transformed process model is created (e.g., in EPC notation) it may then be transformed into a BPMN model 310 for deployment, testing, execution, etc.

Figure 3B:
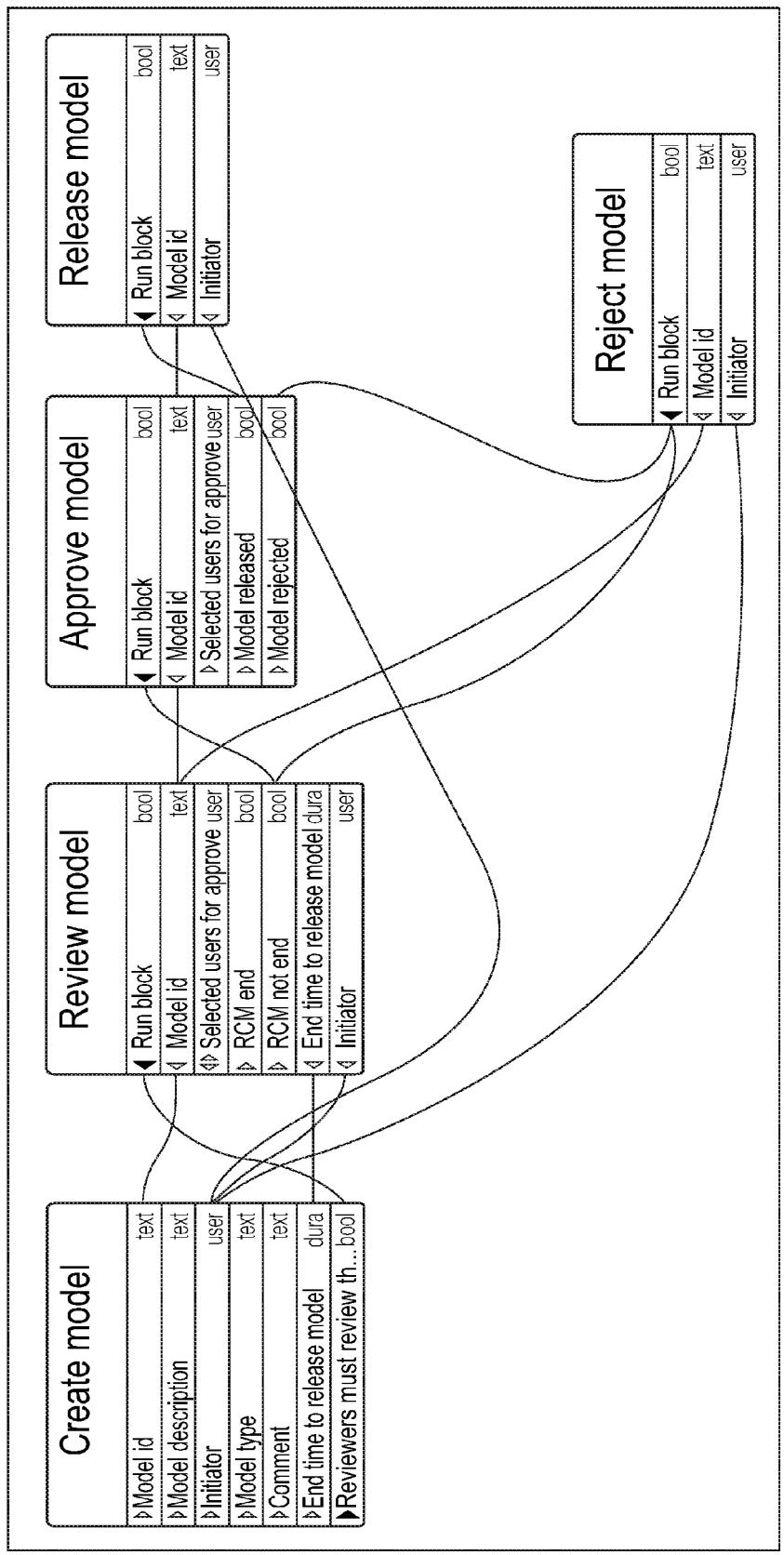
FIG. 3B is an illustration of an example automation diagram.

FIG. 3B is a closer view of the automation diagram 304 from FIG. 3A. The automation diagram includes blocks (that may be referred herein as chains) that respectively include data fields of a given model (e.g., the "Approve Model"). In certain example embodiments, a block may be associated with one or more atomic entities of a business process. For example, a model may include 15 separate entities. Accordingly, a block may be associated with a complete process model and the data fields of the model may be included in the block.

Processes, functions, and the like of control process models may be automatically or manually associated with a block. For example, a user may drag and drop entities of the process flow into associated data flow blocks.

In certain example embodiments, with such an implementation, it may be possible to create a connection between the data fields and subsequently control which block is executed and which is not (e.g. as explained above when the automation diagram is used for a transformation). Accordingly, instead of defining transitions between models with a traditional control flow, the transitions between models may be defined between the data of each of the models.

Figure 4:
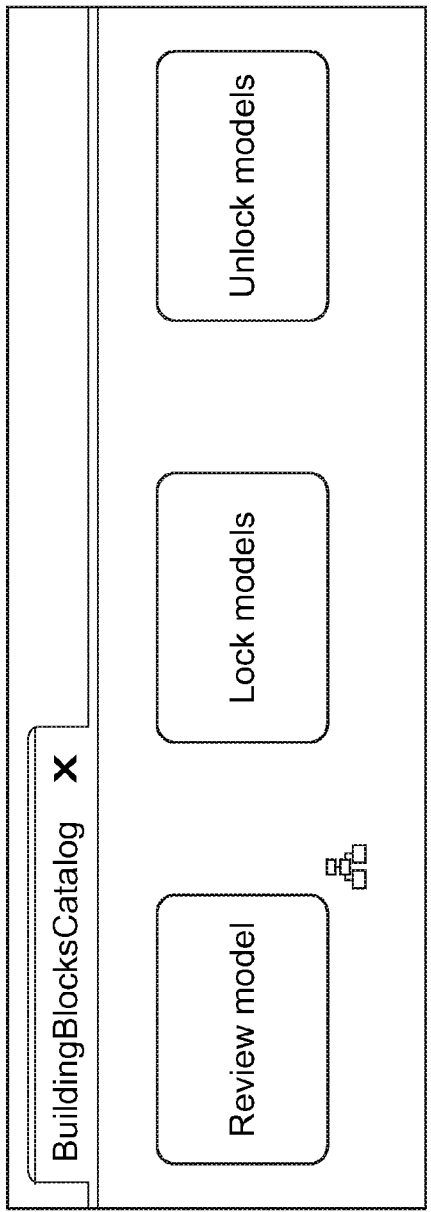
FIG. 4 shows example models that may have corresponding chains in an automation diagram associated therewith according to certain example embodiments.

FIG. 4 shows an example chains catalog according to certain example embodiments. In certain instances, all available blocks may be listed as functions in EPC. A function may relate to active elements in EPC and/or describe transformations from an initial state to a resulting state. This may make it easier for the user to know which blocks do exist. Moreover, from a technical point of view, this may give a user a relatively clear starting point. In certain example embodiments, every function represents a block and it contains an assignment to a Function Allocation Diagram that describes data fields of the respective block.

Figure 5:
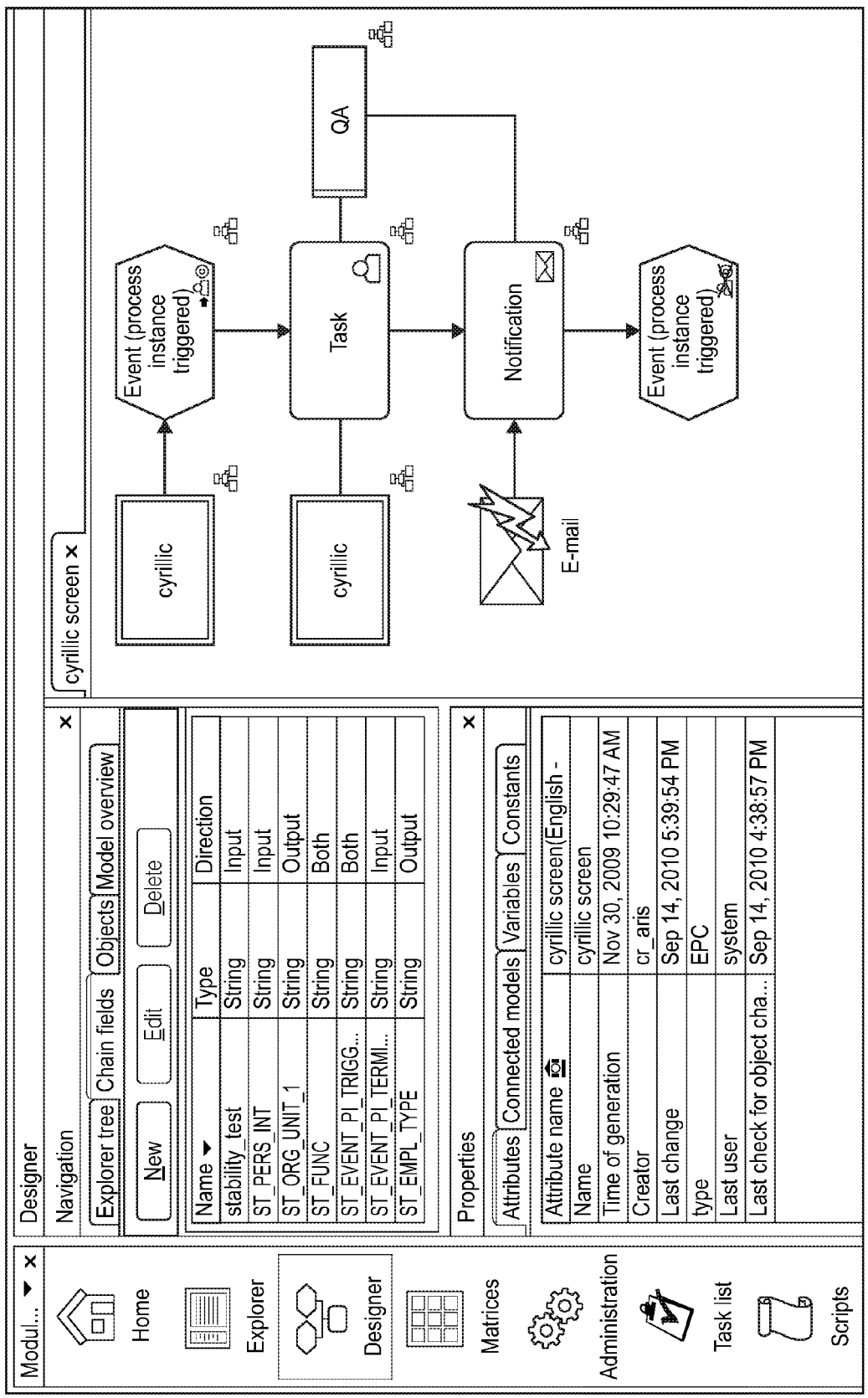
FIG. 5 is an example user interface for defining chain fields that are associated with a business process model.

FIG. 5 is an example user interface for defining chain fields that are associated with a business process model. Here, all the data fields associated with the Cyrillic screen model are presented to a user. The data fields of a model may be specified during EPC process design. In certain example embodiments, there are two types of automation chain data fields. Mandatory fields must be defined before diagram execution. If these fields are not defined, appropriate information may be shown to the user through a validation procedure (e.g., an error message or the like), and the execution may be rejected. Optional fields, on the other hand, may be configured as a user desires. Such fields may or may not have a direct impact on execution behavior.

Generally, automation chain data fields can be input fields that are used to get input information for chain, output fields that are used to share information with another chain, or input and output fields that include both of the above qualities at the same time. The automation chain data fields may also have a variety of different types. Such types may include, for example, string, Boolean, decimal, date, user defined, document, objects, and the like.

Figure 6:
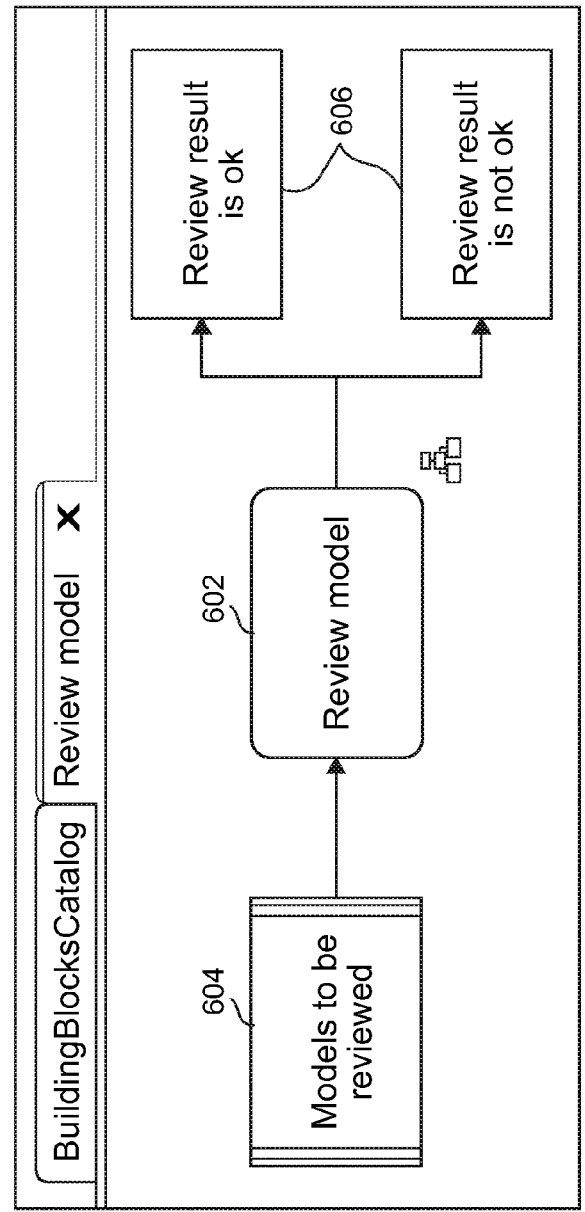
FIG. 6 is an example diagram for a chain that is associated with a business process model.

FIG. 6 is an example diagram for a chain that is associated with a business process model. In certain example embodiments, the storage of the data fields associated with a given model may be done in a function allocation diagram. In FIG. 6, the model in question is the "Review model" process 602. This model includes an input of "models to be reviewed" and outputs 606 that are related to a positive and/or negative review of the models.

Input data fields may be defined via cluster objects, which have an "is input for" connection to the function representing the building block (e.g., 602 in FIG. 6). Output data fields may be defined as entity type objects. The function representing the building block may have a "has output of" connection to entity type objects. The function representing the building block may get another assignment to the EPC model that contains the modeled process (e.g. the functionality of the building block).

Figure 7:
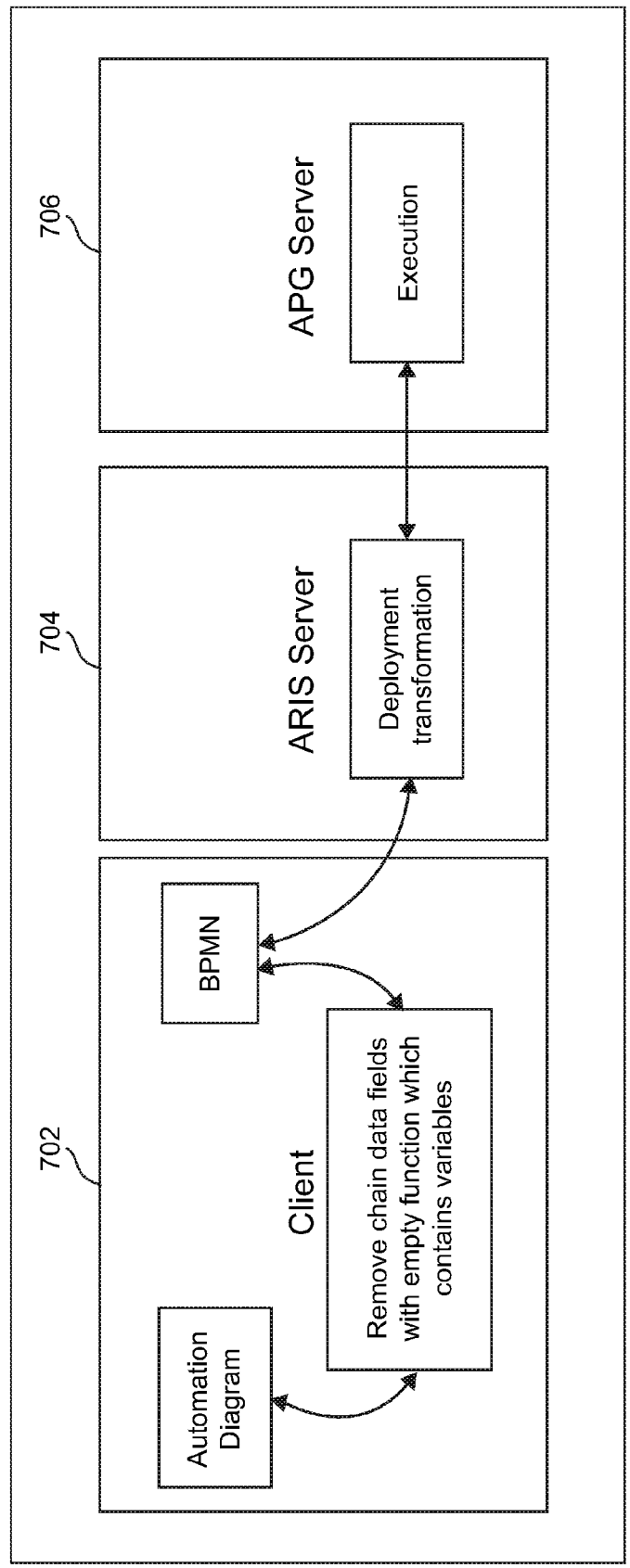
FIG. 7 is an illustrative diagram showing example components to handle design and execution of a process according to certain example embodiments.

FIG. 7 is an illustrative diagram showing example components that handle design and execution of a process according to certain example embodiments. A first component may be a client 702. Such a client may include ARIS Process Automation Architect and/or ARIS Business Architect available from the assignee of the instant application. These client interfaces may be used to create, maintain, and/or transform business processes. In certain example embodiments, the client may support bi-directional transformation of process models. For example, the two transforms discussed with reference to FIG. 3A may also be performed in the opposite direction. Thus, a transformed BPMN model may be transformed back in EPC notation, which may then perform another EPC transform to extract/create an automation diagram. Accordingly, a user may be able to update the data flow of the diagram and then redeploy the diagram to a production environment.

A second component may include an ARIS server 704 for transforming BPMN into executable code that may then be executed on the third component, an APG server 706.

Figure 8:
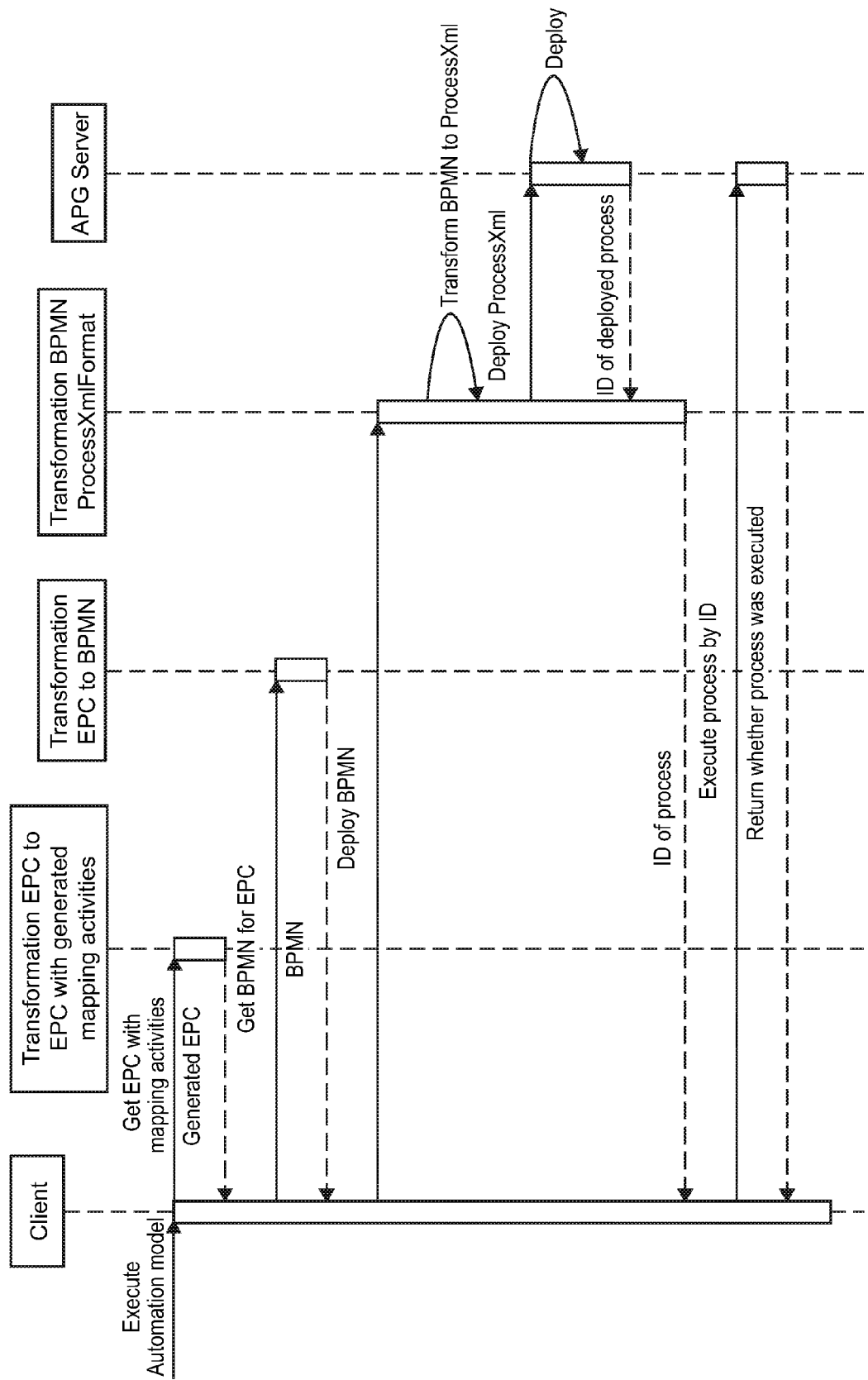
FIG. 8 is an illustrative diagram showing exemplary transformations to create an executable business process.

In certain example embodiments, creating an executable process may include one or more transformations starting from a designed business model. FIG. 8 is an illustrative diagram showing exemplary transformations to create an executable business process. Here, an executing automation model may be completed or provided by a client that has also produced an EPC based process model. The automation model is then injected into the EPC process model. As noted above, in certain example embodiments, this is done by generating mapping activities and including those activities into the EPC model. Once the system has modified the EPC code, the modified code is passed onto a BPMN transformation process that produces BPMN code from the EPC notation. This BPMN is then deployed (e.g., to an ARIS server) that transforms the BPMN into ProcessXML code. The ProcessXML is then deployed to an APG server where it may be executed by instantiating the appropriate process identifier.

Figure 9:
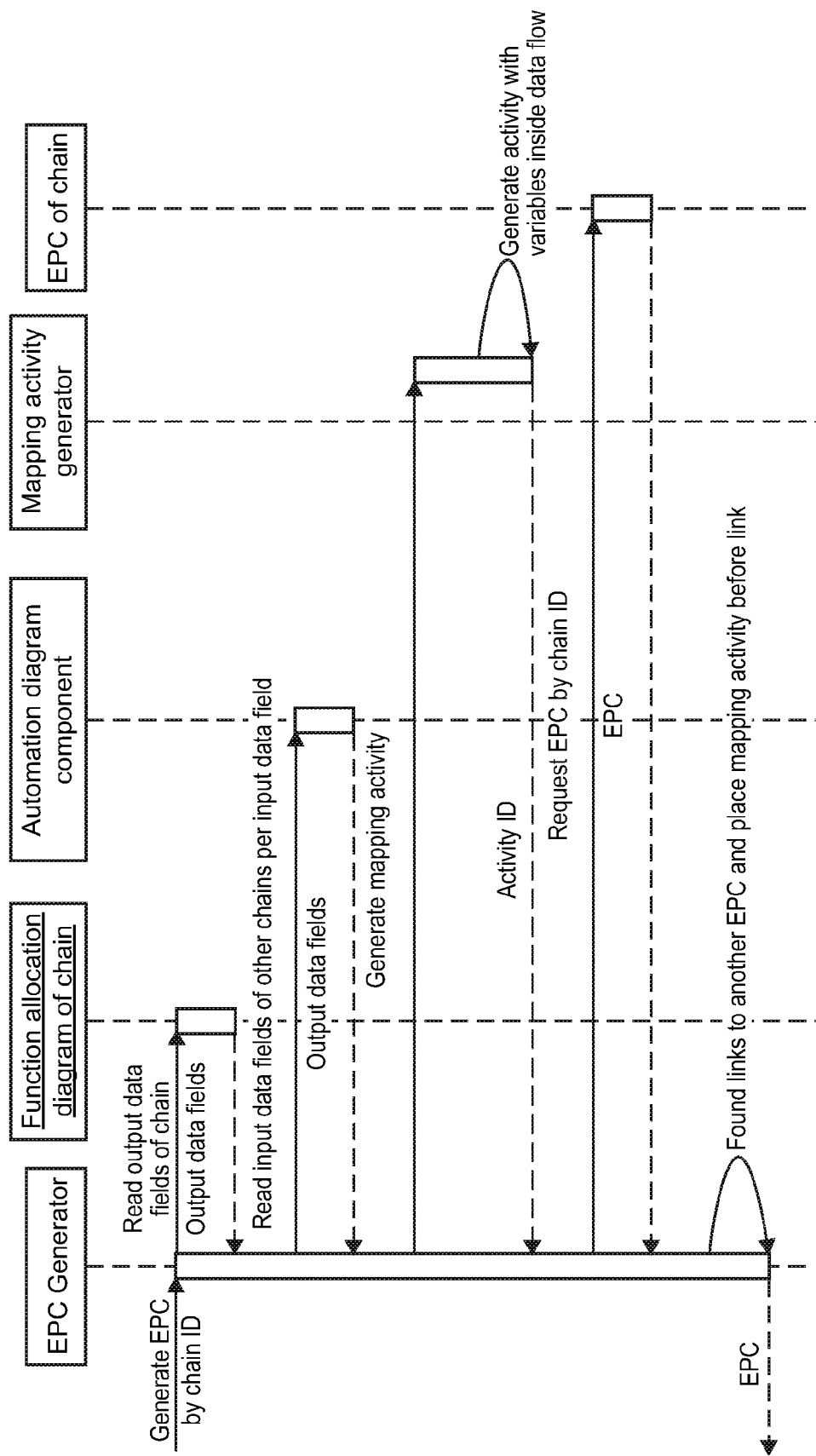
FIG. 9 is an illustrative diagram showing transformations for a business process according to certain example embodiments.

The generation of modified EPC from base EPC may be carried out by a process implemented on a processing system. The processing system may, for example, be a business process server (or development server) and may include one or more processors, associated volatile and/or non-volatile storage areas, etc. FIG. 9 is an illustrative diagram showing transformations for a business process according to certain example embodiments. In certain example embodiments, the following process may be implemented to transform EPC into a modified EPC:

1) Take all chains from an Automation diagram.
2) Generate EPC for each chain
   2.1) Read all output data fields of chain from function allocation diagram of the respective chain
   2.2) For each output data field, find a corresponding input data field(s) on another chain that is connected to it on the Automation diagram:
   2.3) Generate mapping activity:
      2.3.1) Generate activity itself
      2.3.2) Generate data flow for the activity
      2.3.3) Generate variables with a scope of "instance" (e.g., variables which exists within an instance). For each output data field of the current chain, a variable is created, and for each input data field from another chain, a variable is created. Variables are connected with a connection if they are connected on the associated Automation diagram.
   2.4) Locate EPC that is associated with the chain in question chain and copy it.
   2.5) Inject generated mapping activity into just copied EPC. In certain example embodiments, the injection is made before each "link" to another EPC. This may be an event object with the type "process interface."

Accordingly, an EPC model with an accompanying automation diagram may be transformed.

Figure 10:
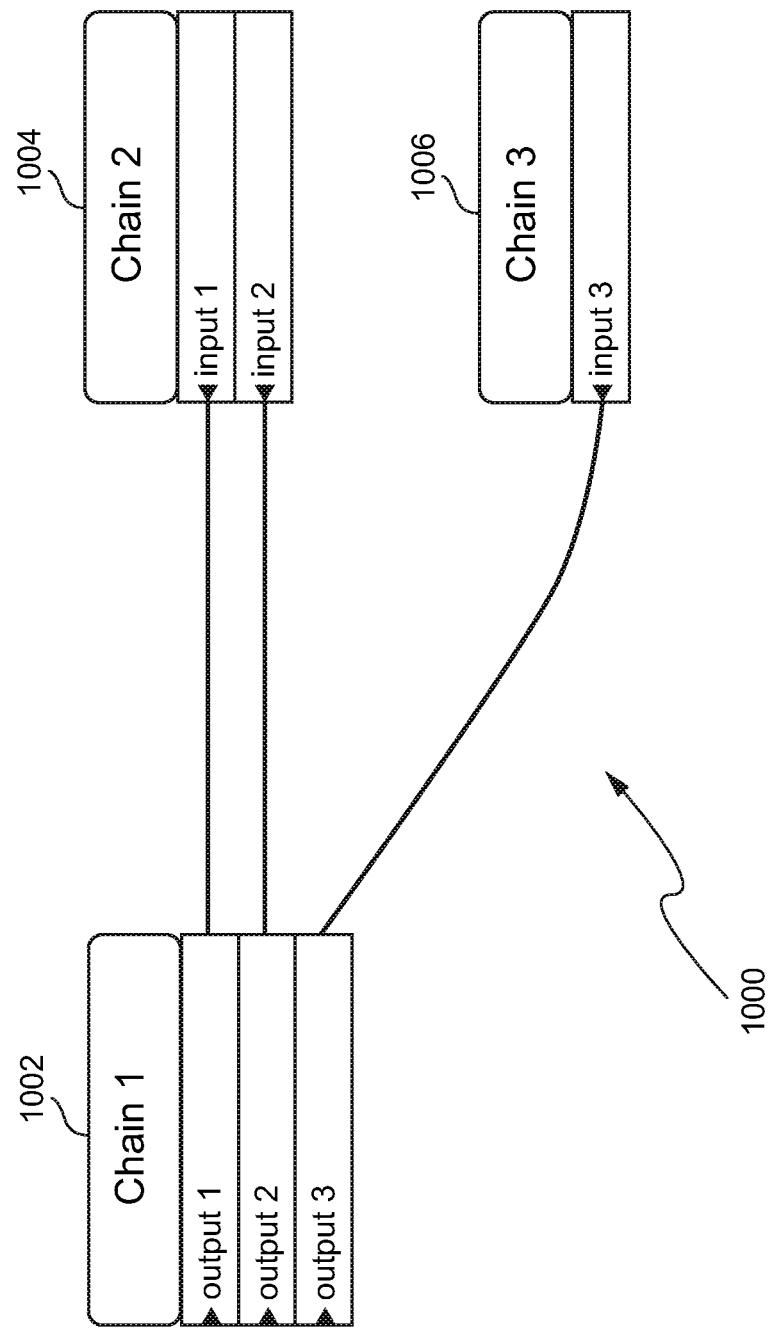
FIG. 10 is an example automation diagram.
Figure 11:
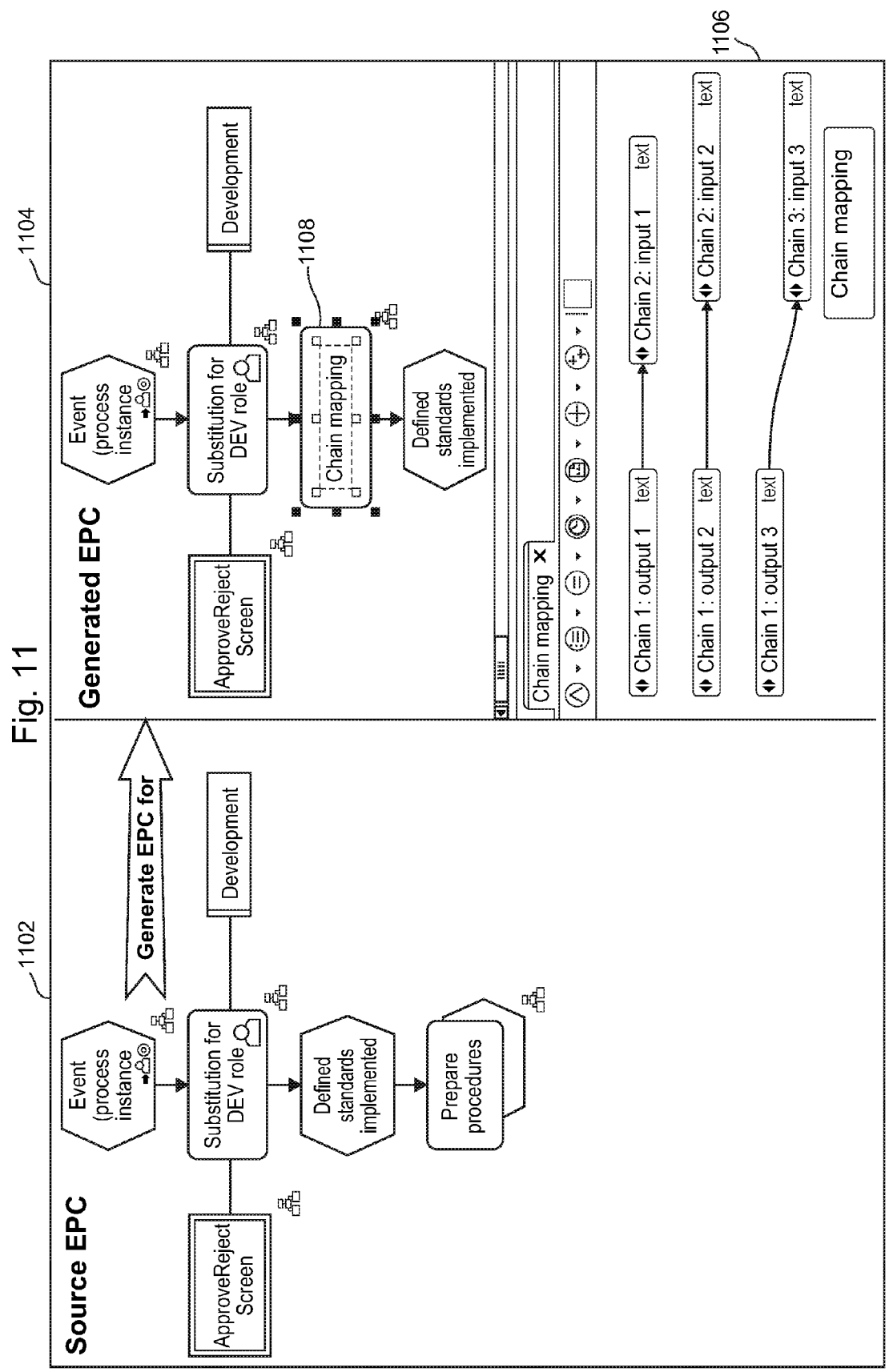
FIG. 11 shows an example transform from a first EPC model to a second EPC model according to certain example embodiments.

FIG. 10 is another example automation diagram and FIG. 11 shows an example transform from a first EPC model to a second EPC model based on the automation diagram shown in FIG. 10. An automation diagram 1000 includes chains 1002, 1004, and 1006. The data flow between the chains is defined such that output 1 from chain 1002 is directed input 1 of chain 1004, the output 2 from chain 1002 is directed to input 2 of chain 1004, and the output 3 from chain 1002 is directed to the input 3 of chain 1006. Chain 1002 is associated with the EPC shown in the diagram of 1102. Thus, new EPC in 1104 is generated based on a chain mapping 1106. As can been seen, the difference between EPCs 1102 and 1104 is the newly generated mapping activity 1108, which contains generated variables in data flow. Variables and connections between the variables are generated according to chain data fields of chain 1002 and the connections between the data fields on the Automation diagram 1000.

Figure 12:
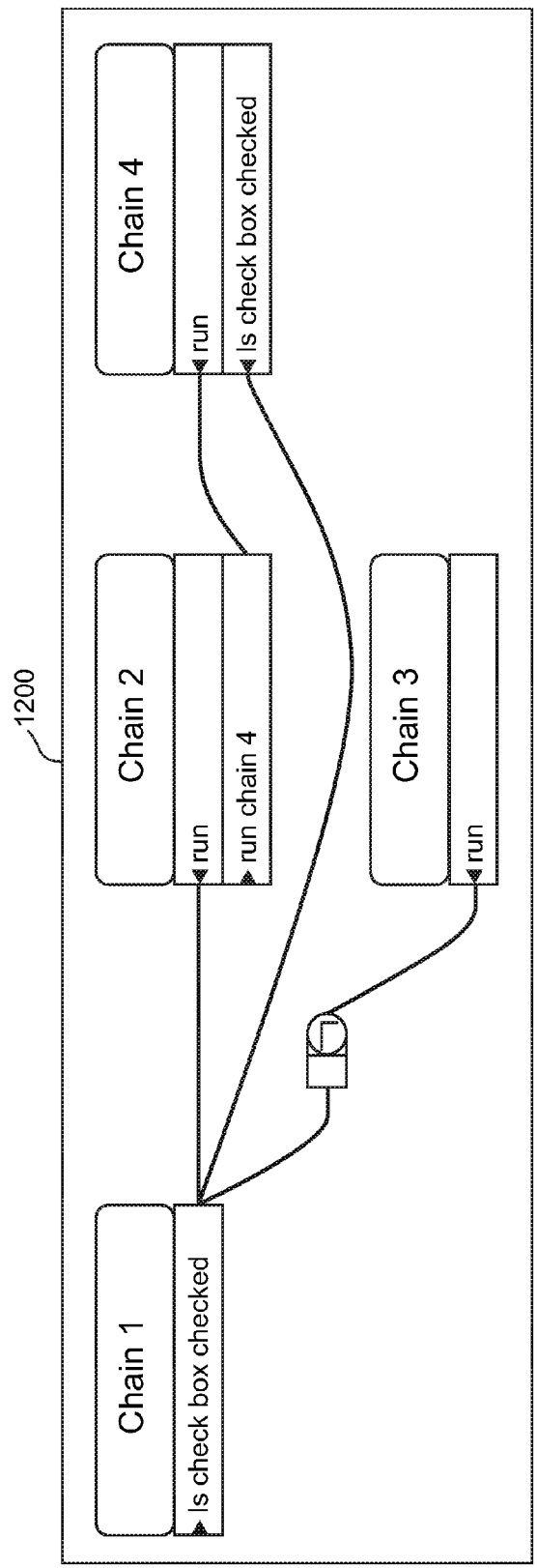
FIG. 12 is another example automation diagram.

FIG. 12 is another example automation diagram. The automation diagram 1200 includes chain 1 that includes one output that is directed to three different chains. Chain 2 includes one input and an instruction output to run chain 4. Chain 3 includes a run command input that is based on the output of chain 1. Chain 4 includes two inputs corresponding to the outputs of chains 1 and 2.

Figure 13:
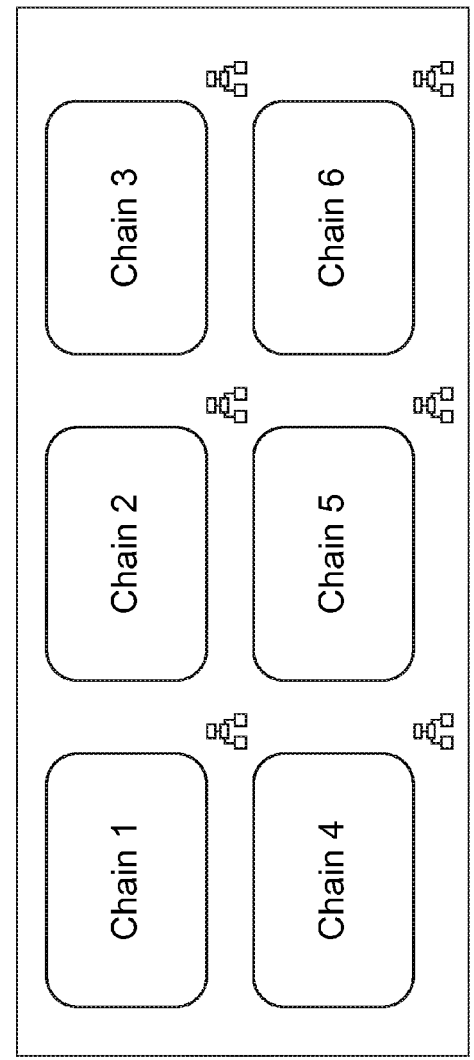
FIG. 13 shows example chains that may be associated with business process models.
Figure 14:
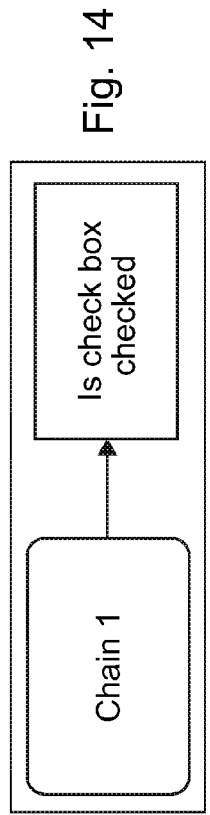
FIGS. 14-17 show example functional allocation diagrams for respective chains based on the automation diagram of FIG. 12.
Figure 15:
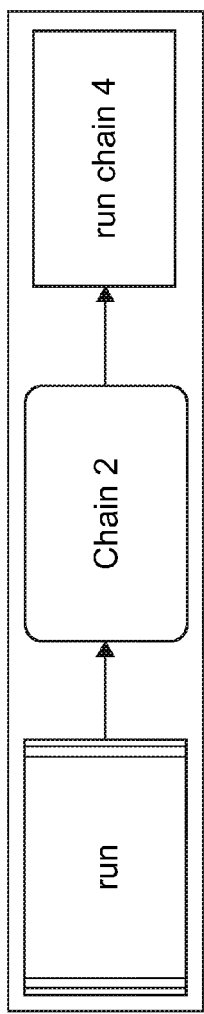
Figure 16:
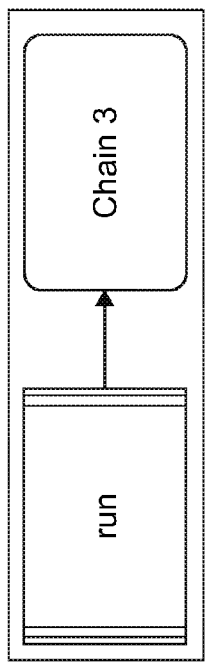
Figure 17:
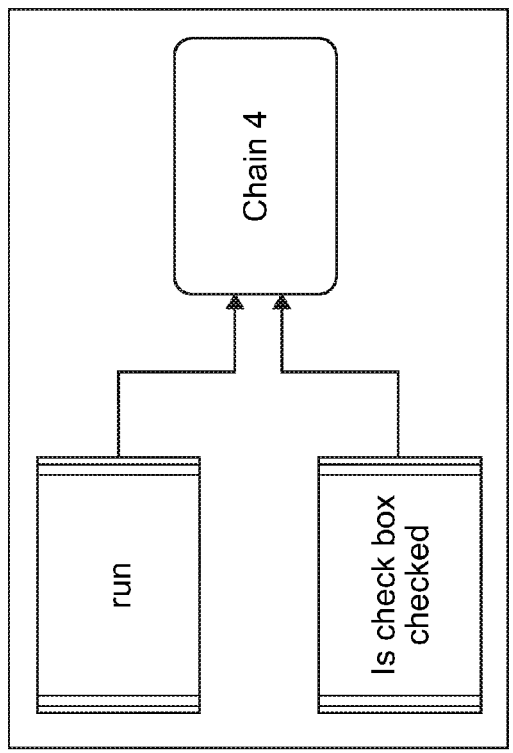

FIG. 13 shows example chains that may be associated with business process models. Each chain may be assigned to a function allocation diagram that describes the given chain. In this respect, FIGS. 14-17 show example functional allocation diagrams for respective chains based on the automation diagram of FIG. 12.

Figure 18:
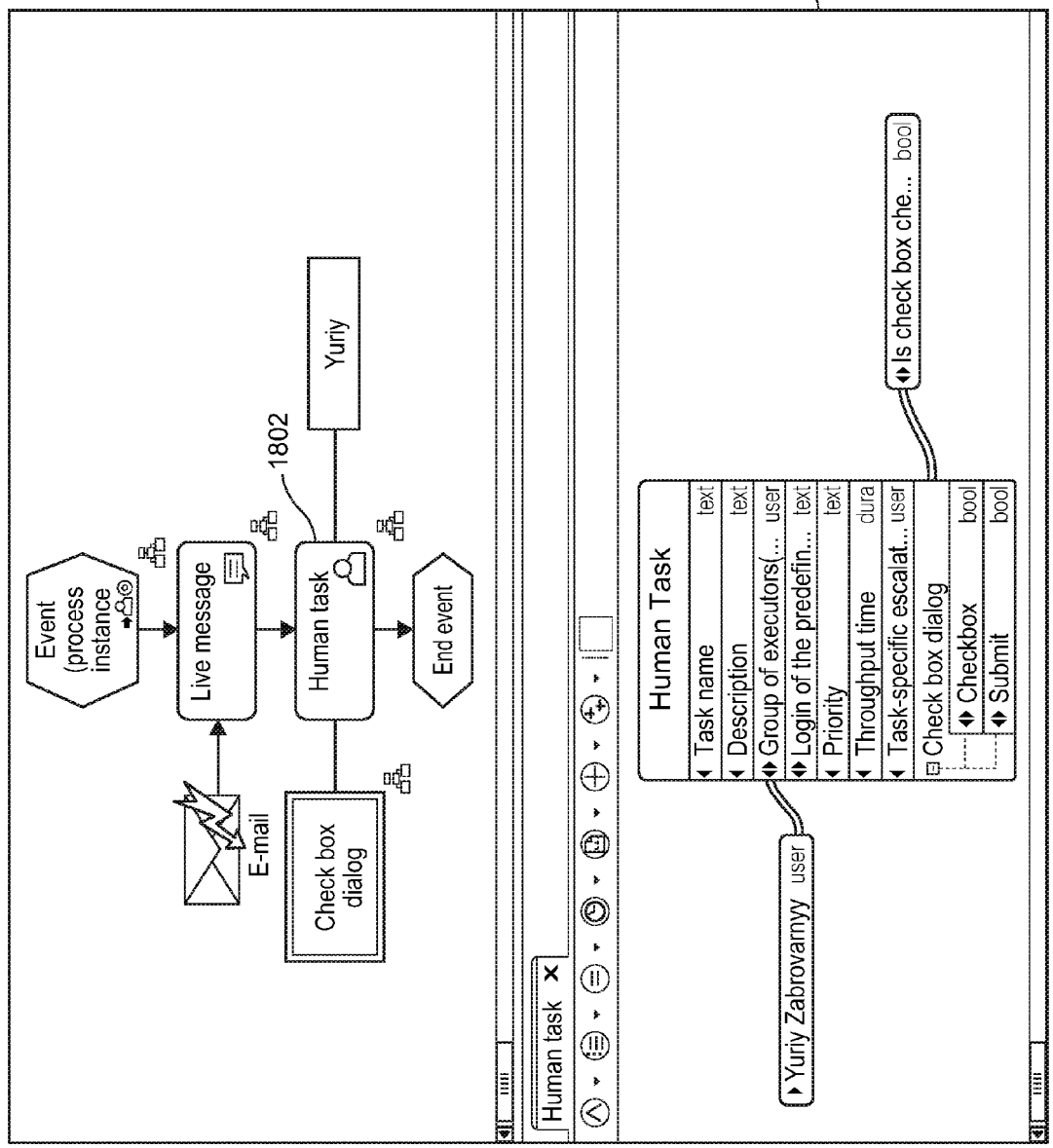
FIGS. 18-21 show example EPC models and their respective data fields according to certain example embodiments.

FIG. 18-21 show example EPC models and their respective data fields according to certain example embodiments. In FIG. 18 the Human Task model (which may also be a process step in a larger model) shown in diagram 1802 includes numerous different data fields that are shown in a corresponding data field view 1804. In the data field view of 1804, a user can assign the checkbox bool value to the Is Check Box Checked input data field of the automation diagram shown in FIG. 12. This value is then input into the other chains shown in FIG. 12. In certain instances, each process step in a model may have a corresponding data mapping (e.g., as shown with respect to the human task in FIG. 18). For example, the live message step in the model shown in FIG. 18 may include a mapping activity and associated data mapping.

Figure 19:
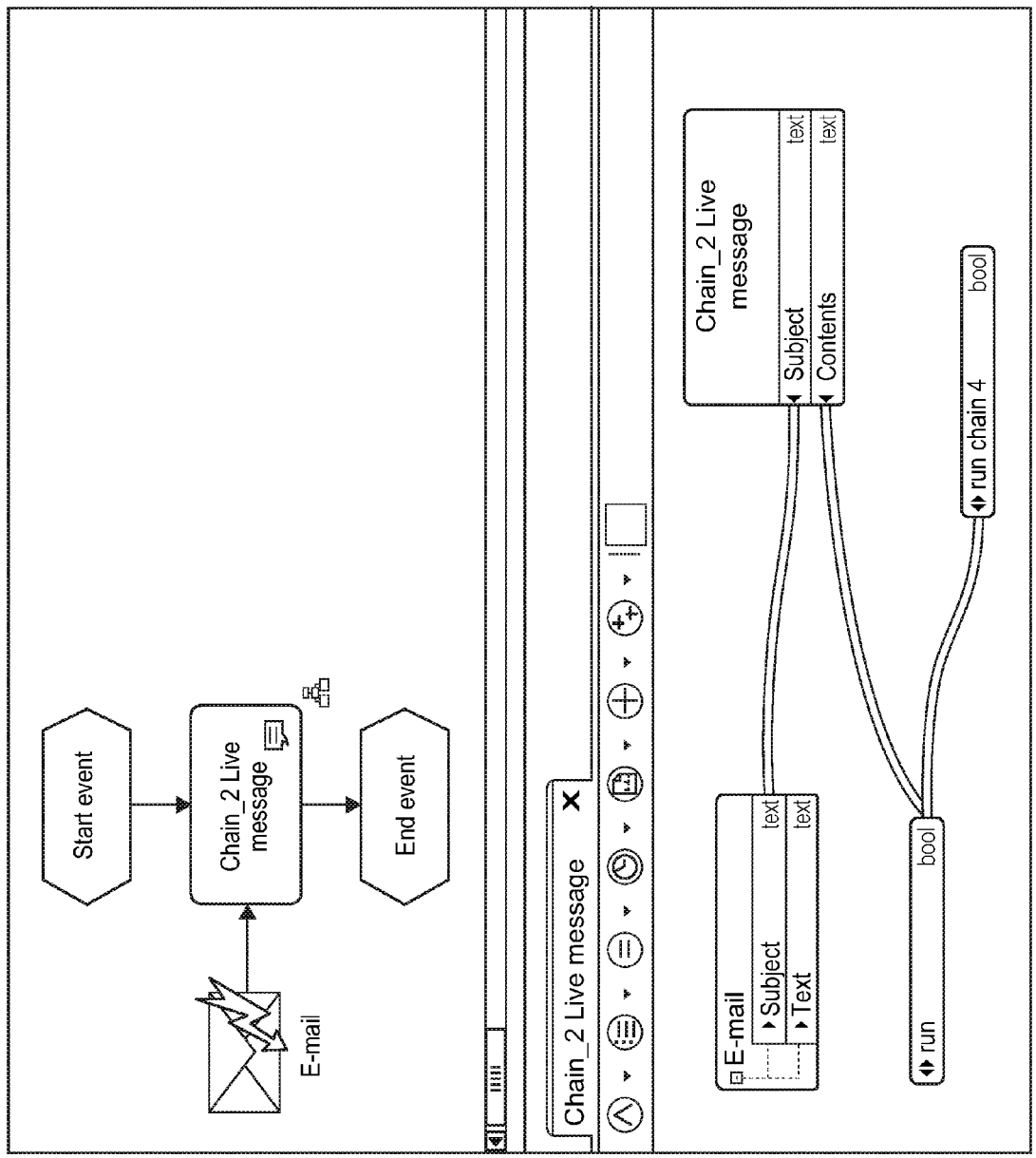
Figure 20:
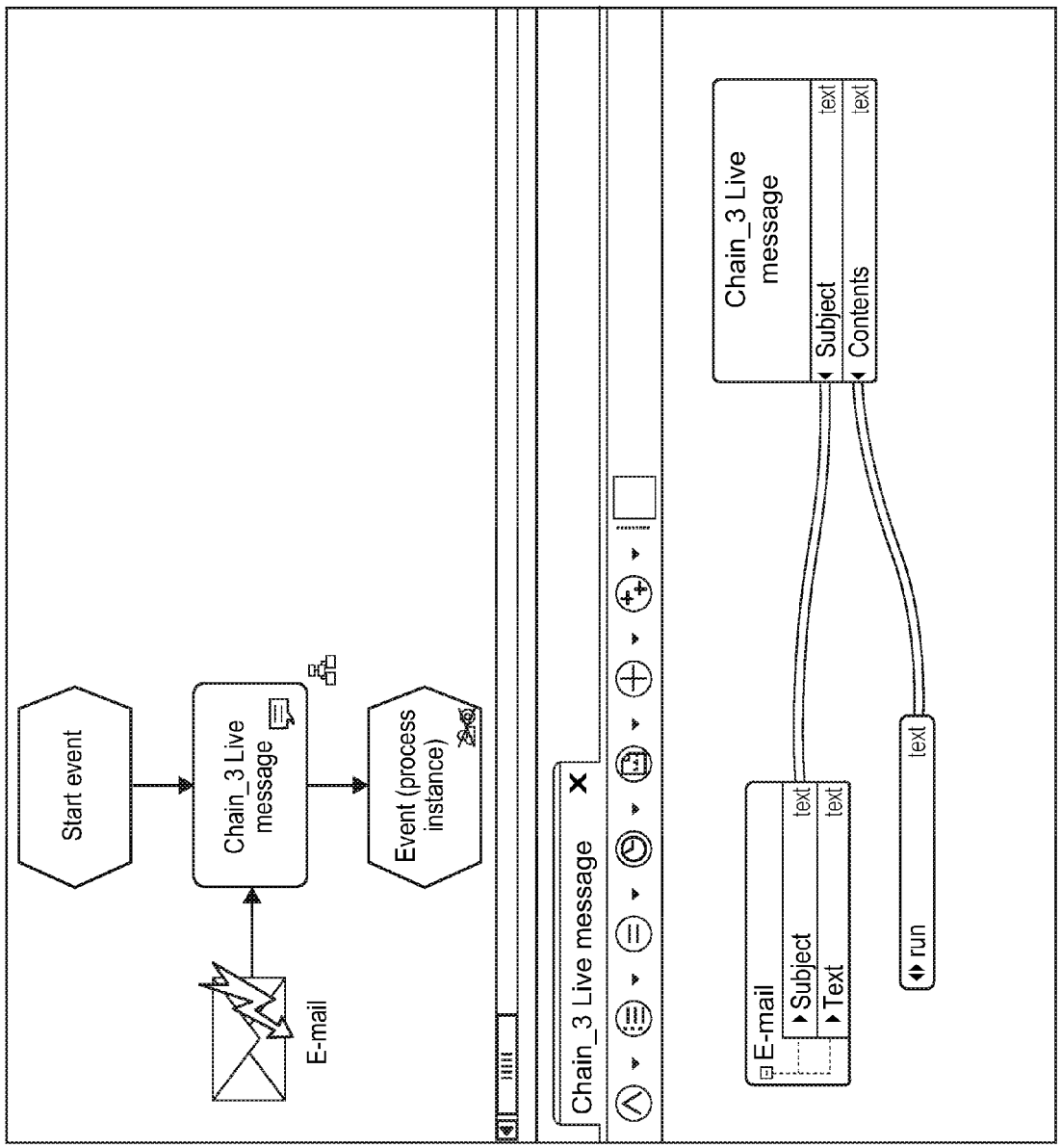
Figure 21:
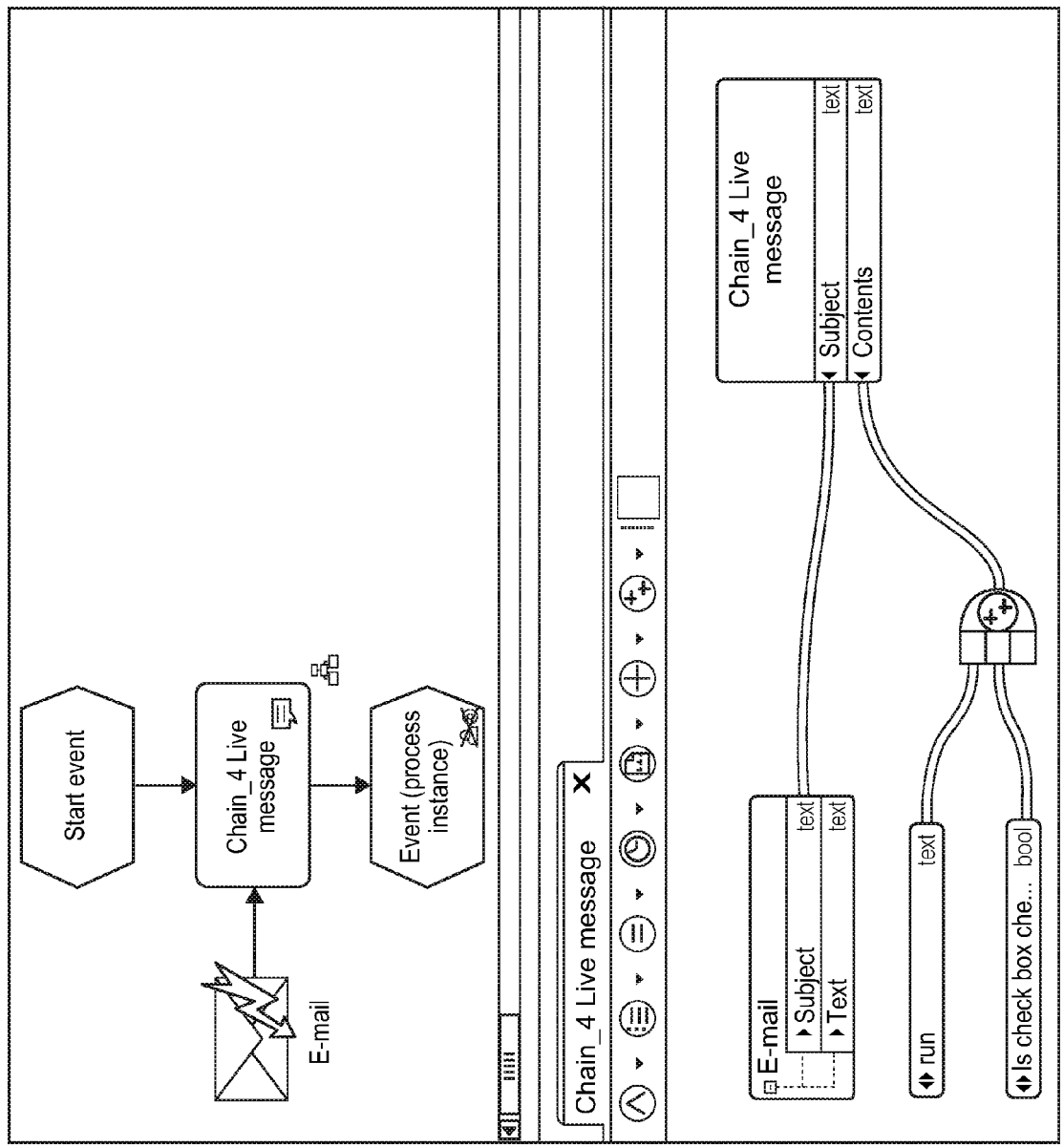
Figure 22:
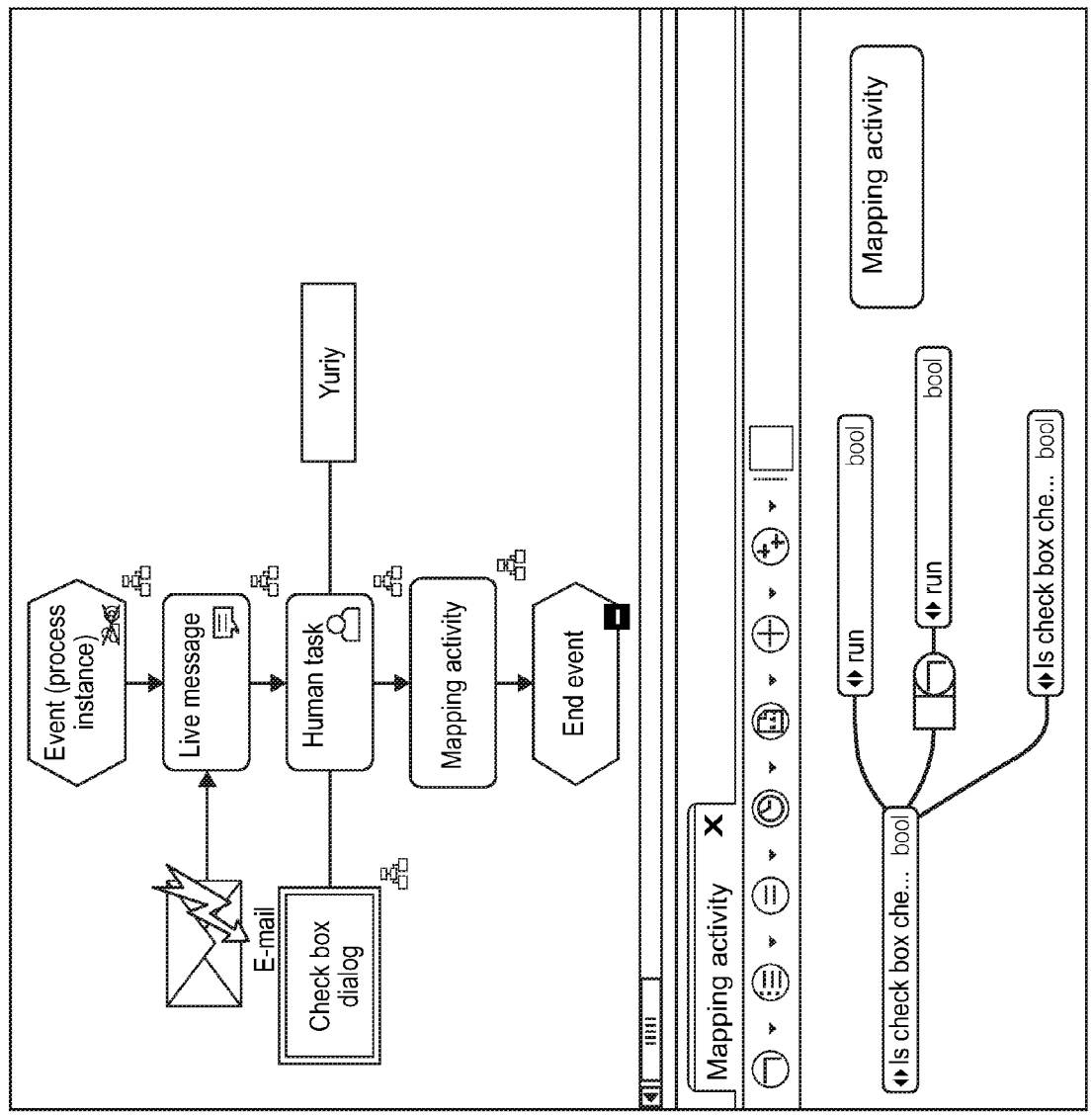
FIGS. 22-25 show modified EPC models with injected data flow as a result of an example transformation from the respective EPC models of FIGS. 18-21.

It will be appreciated that other values may be swapped out and assigned to the input data field value. Accordingly, the flow of a given business process may be altered by assigning a new value to be associated with the automation diagram. This may occur because the flow of a given process may be driven by the data flow rather than the control flow. As explained herein, these changes may be propagated to a modified EPC model, a BPMN, and/or other notation scheme for processing. FIGS. 19-21 show similar assignments for inputs and outputs to variables of a given function in the respective EPC models.

Figure 23:
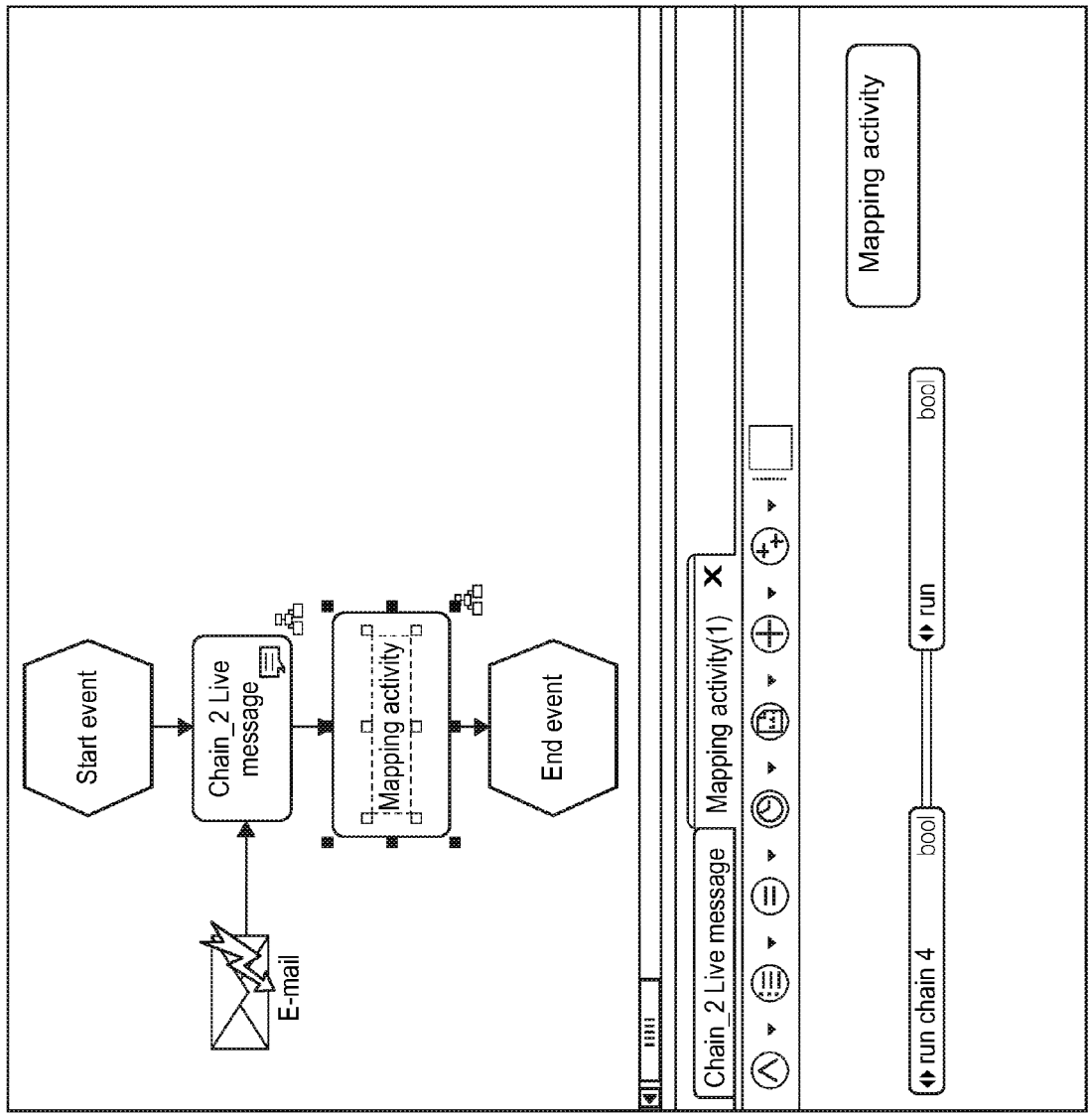
Figure 25:
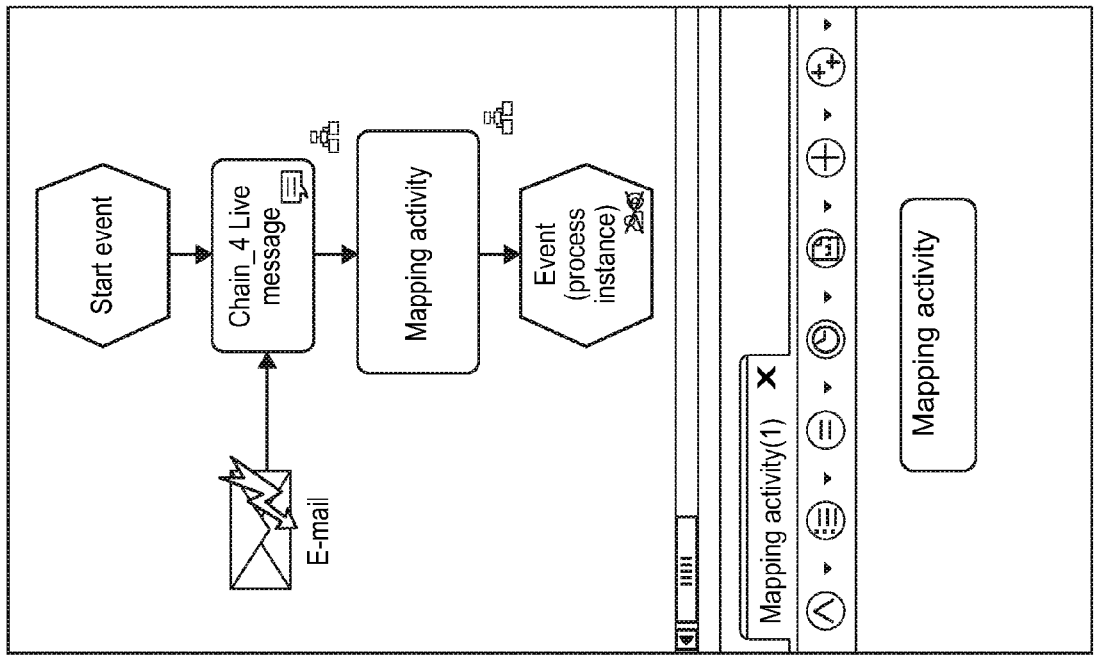
Figure 24:
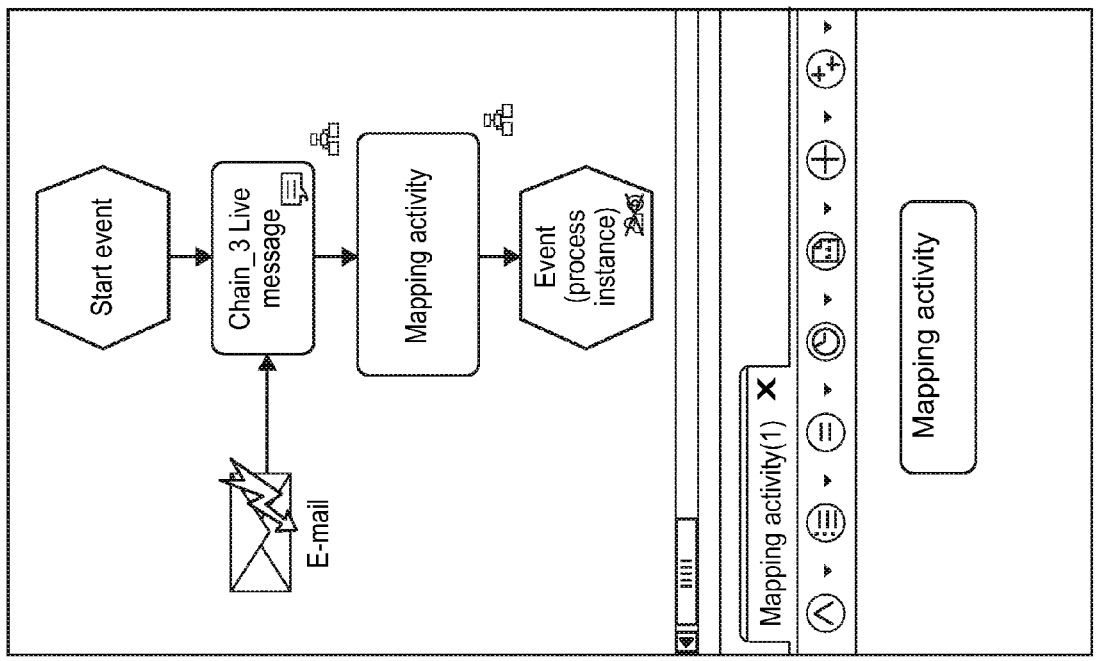

FIG. 22-25 show modified EPC models with an injected data flow as a result of an example transformation from the respective EPC models from FIGS. 18-21. For example, in FIG. 22 EPC, code is generated based on the automation diagram from FIG. 12 and the assignment of variables in view 1804 of FIG. 18. As explained above, the result of this generation is an injection into the EPC code of a mapping activity that includes the generated variables of the data flow. FIGS. 23-25 show similar injected mapping activities for chains 2-4.

After injecting the additional EPC code into the base EPC model, the modified EPC models may be transformed into a more technical process specification (e.g., BPMN). FIG. 26-29 show BPMN models transformed from the EPC models shown in FIGS. 22-25. During the transformation from EPC to BPMN (e.g., EPC2BPMN), the process may consider the chains' function allocation diagrams and mapping activities such that at the end of a process a link event instead of end event is created. Similarly, at the beginning of a process, a create link event may be created instead of a start process event. In certain example embodiments, this form of generation may be done when a mapping activity includes variable mappings that belong to another chain.

Accordingly, based on the example models and transforms described in FIGS. 12-29, a modeled business process may be executed on a processing system/server. For example, a check box may be presented during the "human task" activity described above and a user may check the checkbox. This information may be passed off to subsequent processes (e.g., the live messages events in the subsequent chains) and/or events.

In certain example embodiments, a process is started by selecting a database that holds business processes. The below described messages are output/input/processed/etc by the executing process described in FIGS. 12-29.

Chain 1

When the process instances is started, the following may be the output message for the staring of the process instance:

```
<?xml version="1.0" encoding="UTF-8"?>
<input xmlns:ns2="http://www.ids-scheer.com/age/common"
xmlns:ns3="http://www.ids-scheer.com/age/process"
xmlns:ns4="http://www.ids-scheer.com/age/um"
xmlns:ns5="http://www.ids-
scheer.com/age/process/def" xmlns:ns6="http://www.ids-
scheer.com/aris/common" xmlns:ns7="http://www.ids-
scheer.com/age/pa/dataaccess">
  <context xmlns:ns10="http://www.ids-scheer.com/age/scenario"
xmlns:ns3="http://www.ids-scheer.com/aris/common"
xmlns:ns4="http://www.ids-scheer.com/age/schedule"
xmlns:ns5="http://www.ids-scheer.com/age/pa"
xmlns:ns6="http://www.ids-
scheer.com/age/um" xmlns:ns8="http://www.ids-scheer.com/age/process"
xmlns:ns9="http://www.ids-scheer.com/age/simulation"
xmlns:xmime="http://www.w3.org/2005/05/xmlmime">
    <currentDatabase>APG TEST DATABASE</currentDatabase>
    <currentServer>idsuasrv01</currentServer>
    <currentUser>yzabrovarnyy_aris</currentUser>
    <currentFilter>dd838074-ac29-11d4-85b8-
00005a4053ff</currentFilter>
    <currentLanguage>en_US</currentLanguage>
    <selectedGuids>
      <guid/>
    </selectedGuids>
    <selectedNames>
      <name/>
    </selectedNames>
    <selectedTypeNames>
      <typeName/>
    </selectedTypeNames>
    <selectedTypeAPINames>
      <typeAPIName/>
    </selectedTypeAPINames>
  </context>
</input>
```

Figure 26:
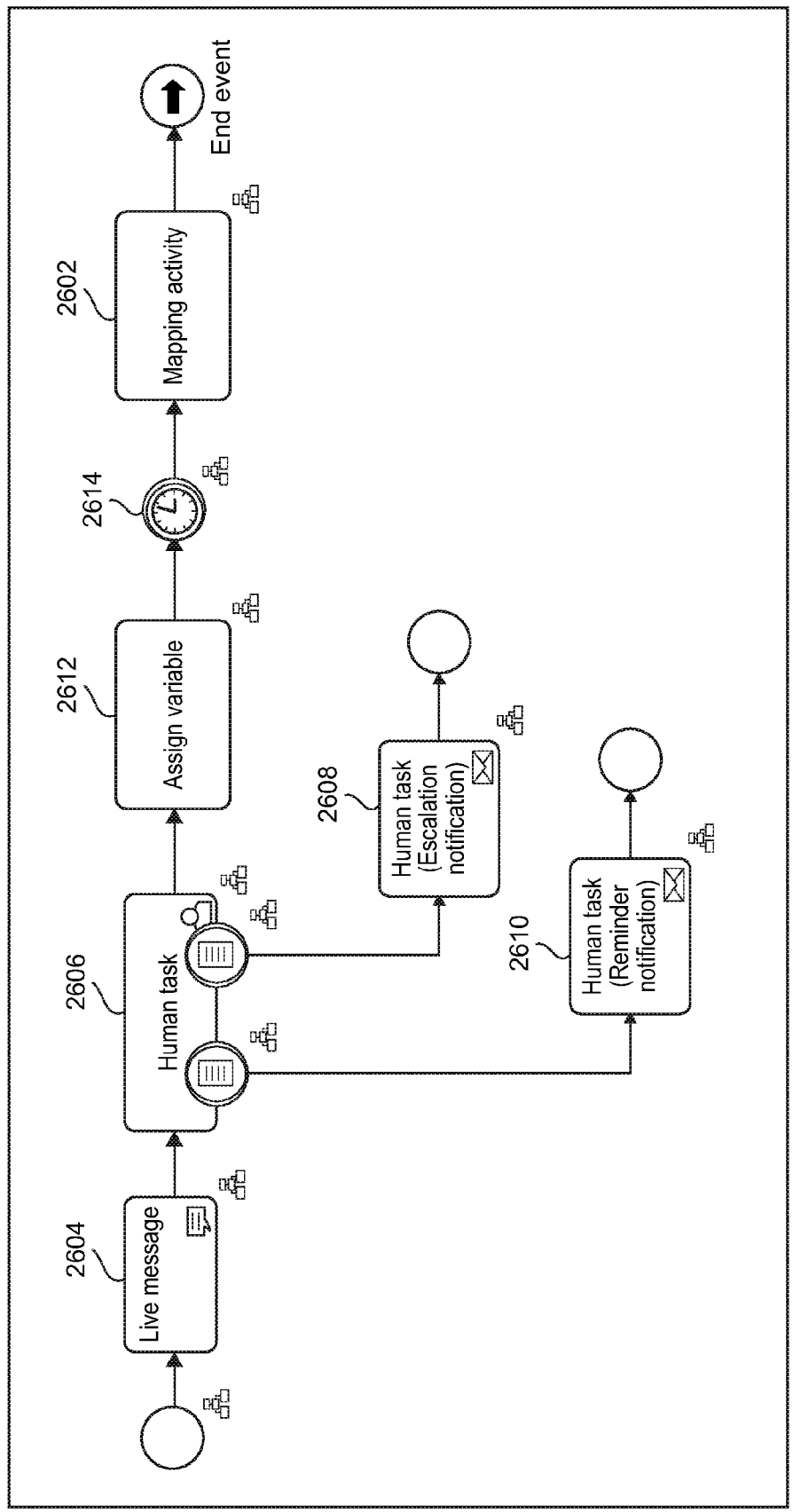
FIGS. 26-29 show BPMN models transformed from the EPC models in FIGS. 22-25.
Figure 27:
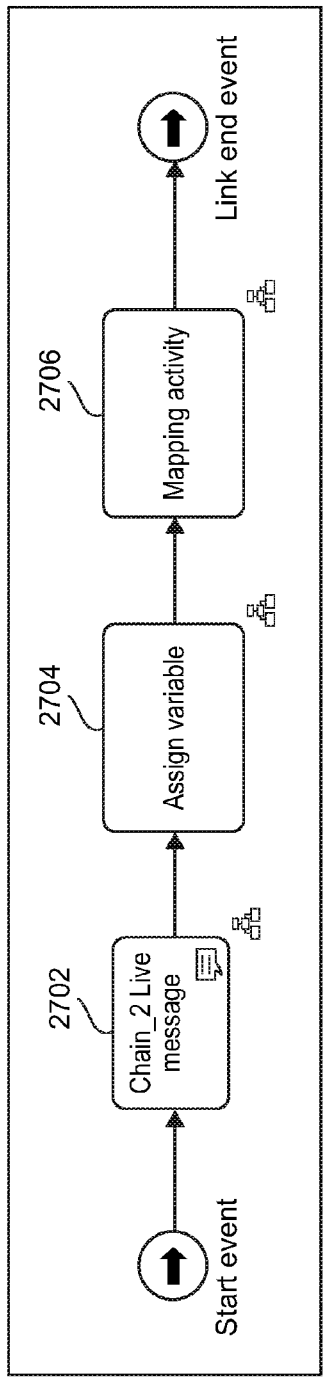
Figure 28:
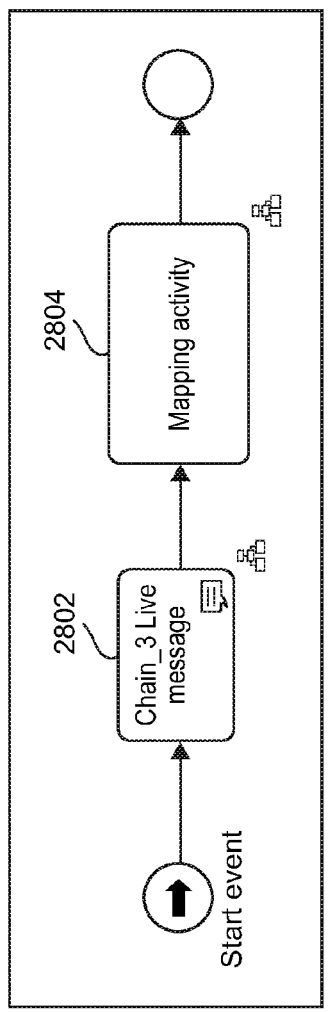
Figure 29:
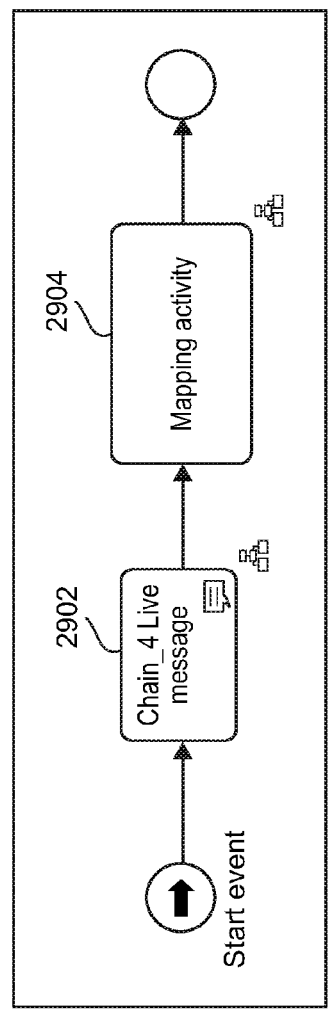

The live message function 2604 in FIG. 26 may have the following input message with no accompanying output message:

```
<?xml version="1.0" encoding="UTF-8"?>
<message xmlns:ns2="http://www.ids-scheer.com/age/common"
xmlns:ns3="http://www.ids-scheer.com/age/process"
xmlns:ns4="http://www.ids-scheer.com/age/um"
xmlns:ns5="http://www.ids-
scheer.com/age/process/def" xmlns:ns6="http://www.ids-
scheer.com/aris/common" xmlns:ns7="http://www.ids-
scheer.com/age/pa/dataaccess">
  <subject/>
  <body/>
  <ads_password>e23fd19759a46423b0a7f198965d5b6f
  </ads_password>
</message>
```

The Human task function 2606 may have the following input message followed by the following output message:

```
<?xml version="1.0" encoding="UTF-8"?>
<message xmlns:ns2="http://www.ids-scheer.com/age/common"
xmlns:ns3="http://www.ids-scheer.com/age/process"
```

-continued

```
xmlns:ns4="http://www.ids-scheer.com/age/um"
xmlns:ns5="http://www.ids-
scheer.com/age/process/def" xmlns:ns6="http://www.ids-
scheer.com/aris/common" xmlns:ns7="http://www.ids-
scheer.com/age/pa/dataaccess">
    <participantGroups>
        <participantGroup>
            <participants>
                <participant>
                    <id>
                        <idValue>36bc030c-df47-3f2c-a5c5-
                            b8ef5cb140bb</idValue>
                        <idType>UUID</idType>
                    </id>
                    <participantType>USER</participantType>
                    <displayName>Yuriy Zabrovarnyy</displayName>
                </participant>
            </participants>
            <completionPolicy>ONE</completionPolicy>
            <resourcePolicy>COMMIT_RESOURCE</resourcePolicy>
            <resourceGroupName/>
        </participantGroup>
    </participantGroups>
</message>
<?xml version="1.0" encoding="UTF-8"?>
<ns2:output xmlns:ns2="http://ids-
scheer.com/age/activities/humantask/messages"
xmlns:ns1="http://www.ids-
scheer.com/namespace/aform" xmlns:ns3="http://www.ids-
scheer.com/age/process" xmlns:ns4="http://www.ids-scheer.com/age/um"
xmlns:ns5="http://www.ids-scheer.com/age/process/def"
xmlns:ns6="http://www.ids-scheer.com/aris/common"
xmlns:ns7="http://www.ids-scheer.com/age/pa/dataaccess">
    <callbackId>E6HXW0crQ+yS7yzKLY67vw==</callbackId>
    <ns1:aFormData>
        <instance>
            <Check_box_dialog>
                <Checkbox>false</Checkbox>
                <Submit>true</Submit>
            </Check_box_dialog>
        </instance>
    </ns1:aFormData>
    <participantGroups>
        <participantGroup>
            <participants>
                <participant>
                    <id>
                        <idValue>36bc030c-df47-3f2c-a5c5-
                            b8ef5cb140bb</idValue>
                        <idType>UUID</idType>
                    </id>
                    <participantType>USER</participantType>
                    <displayName>yzabrovarnyy</displayName>
                    <email>yuriy.zabrovarnyy@softwareag.com</email>
                </participant>
            </participants>
            <completionPolicy>ALL</completionPolicy>
            <resourcePolicy>NONE</resourcePolicy>
        </participantGroup>
    </participantGroups>
    <completedDate>2011-06-07T16:28:38Z</completedDate>
    <dueDate>2011-06-07T16:28:38Z</dueDate>
</ns2:output>
```

The Human task (Escalation event) function 2608 may have the following input message followed by the following output message:

```
<?xml version="1.0" encoding="UTF-8"?>
<message xmlns:ns2="http://www.ids-scheer.com/age/common"
xmlns:ns3="http://www.ids-scheer.com/age/process"
xmlns:ns4="http://www.ids-scheer.com/age/um"
xmlns:ns5="http://www.ids-
scheer.com/age/process/def" xmlns:ns6="http://www.ids-
scheer.com/aris/common" xmlns:ns7="http://www.ids-
scheer.com/age/pa/dataaccess">
    <participantGroups>
        <participantGroup>
            <participants>
                <participant>
                    <id>
```

-continued

```
<participantGroups>
    <participantGroup>
        <participants>
            <participant>
                <id>
                    <idValue>36bc030c-df47-3f2c-a5c5-
                        b8ef5cb140bb</idValue>
                    <idType>UUID</idType>
                </id>
                <participantType>USER</participantType>
                <displayName>Yuriy Zabrovarnyy</displayName>
            </participant>
        </participants>
        <completionPolicy>ONE</completionPolicy>
        <resourcePolicy>COMMIT_RESOURCE</resourcePolicy>
        <resourceGroupName/>
    </participantGroup>
</participantGroups>
</message>
<?xml version="1.0" encoding="UTF-8"?>
<ns2:output xmlns:ns2="http://ids-
scheer.com/age/activities/humantask/messages"
xmlns:ns1="http://www.ids-
scheer.com/namespace/aform" xmlns:ns3="http://www.ids-
scheer.com/age/process" xmlns:ns4="http://www.ids-scheer.com/age/um"
xmlns:ns5="http://www.ids-scheer.com/age/process/def"
xmlns:ns6="http://www.ids-scheer.com/aris/common"
xmlns:ns7="http://www.ids-scheer.com/age/pa/dataaccess">
    <callbackId>E6HXW0crQ+yS7yzKLY67vw==</callbackId>
    <ns1:aFormData>
        <instance>
            <Check_box_dialog>
                <Checkbox>false</Checkbox>
                <Submit>true</Submit>
            </Check_box_dialog>
        </instance>
    </ns1:aFormData>
    <participantGroups>
        <participantGroup>
            <participants>
                <participant>
                    <id>
                        <idValue>36bc030c-df47-3f2c-a5c5-
                            b8ef5cb140bb</idValue>
                        <idType>UUID</idType>
                    </id>
                    <participantType>USER</participantType>
                    <displayName>yzabrovarnyy</displayName>
                    <email>yuriy.zabrovarnyy@softwareag.com</email>
                </participant>
            </participants>
            <completionPolicy>ALL</completionPolicy>
            <resourcePolicy>NONE</resourcePolicy>
        </participantGroup>
    </participantGroups>
    <completedDate>2011-06-07T16:28:38Z</completedDate>
    <dueDate>2011-06-07T16:28:38Z</dueDate>
</ns2:output>
```

The Human task (Reminder event) function 2610 may have the following input message followed by the following output message:

```
<?xml version="1.0" encoding="UTF-8"?>
<message xmlns:ns2="http://www.ids-scheer.com/age/common"
xmlns:ns3="http://www.ids-scheer.com/age/process"
xmlns:ns4="http://www.ids-scheer.com/age/um"
xmlns:ns5="http://www.ids-
scheer.com/age/process/def" xmlns:ns6="http://www.ids-
scheer.com/aris/common" xmlns:ns7="http://www.ids-
scheer.com/age/pa/dataaccess">
```

```
            <idValue>36bc030c-df47-3f2c-a5c5-
            b8ef5cb140bb</idValue>
            <idType>UUID</idType>
         </id>
         <participantType>USER</participantType>
         <displayName>Yuriy Zabrovarnyy</displayName>
      </participant>
    </participants>
    <completionPolicy>ONE</completionPolicy>
    <resourcePolicy>COMMIT_RESOURCE</resourcePolicy>
    <resourceGroupName/>
  </participantGroup>
</participantGroups>
</message>
<?xml version="1.0" encoding="UTF-8"?>
<ns2:output xmlns:ns2="http://ids-
scheer.com/age/activities/humantask/messages"
xmlns:ns1="http://www.ids-
scheer.com/namespace/aform" xmlns:ns3="http://www.ids-
scheer.com/age/process" xmlns:ns4="http://www.ids-scheer.com/age/um"
xmlns:ns5="http://www.ids-scheer.com/age/process/def"
xmlns:ns6="http://www.ids-scheer.com/aris/common"
xmlns:ns7="http://www.ids-scheer.com/age/pa/dataaccess">
    <callbackId>E6HXW0crQ+yS7yzKLY67vw==</callbackId>
    <ns1:aFormData>
       <instance>
          <Check_box_dialog>
             <Checkbox>false</Checkbox>
             <Submit>true</Submit>
          </Check_box_dialog>
       </instance>
    </ns1:aFormData>
    <participantGroups>
       <participantGroup>
          <participants>
             <participant>
                <id>
                   <idValue>36bc030c-df47-3f2c-a5c5-
                   b8ef5cb140bb</idValue>
                   <idType>UUID</idType>
                </id>
                <participantType>USER</participantType>
                <displayName>yzabrovarnyy</displayName>
                <email>yuriy.zabrovarnyy@softwareag.com</email>
             </participant>
          </participants>
          <completionPolicy>ALL</completionPolicy>
          <resourcePolicy>NONE</resourcePolicy>
       </participantGroup>
    </participantGroups>
    <completedDate>2011-06-07T16:28:38Z</completedDate>
    <dueDate>2011-06-07T16:28:38Z</dueDate>
</ns2:output>
```

The assign variable function 2612 does not have an output or input message, but does assign variables. For the variable assignment: Is check box checked (initialization of input data field of chain 1) may have the following data.

```
<?xml version='1.0' encoding='UTF-8'?>
<Checkbox>true</Checkbox>
```

The timer 2614 event may include an input message but no accompanying output message:

```
<?xml version="1.0" encoding="UTF-8"?>
<message xmlns:ns2="http://www.ids-scheer.com/age/common"
xmlns:ns3="http://www.ids-scheer.com/age/process"
xmlns:ns4="http://www.ids-scheer.com/age/um"
xmlns:ns5="http://www.ids-
scheer.com/age/process/def" xmlns:ns6="http://www.ids-
scheer.com/aris/common" xmlns:ns7="http://www.ids-
scheer.com/age/pa/dataaccess">
```

```
    <timeDate>2011-06-07T16:29:10Z</timeDate>
</message>
```

The mapping activity 2602 may assign variables. Variable assignment: run (initialization input data field of chains 2):

```
<?xml version='1.0' encoding='UTF-8'?>
<Checkbox>true</Checkbox>
```

Variable assignment: run (initialization input data field of chains 3):

```
<?xml version='1.0' encoding='UTF-8'?>
<Checkbox>false</Checkbox>
```

Variable assignment: Is check box checked (initialization input data field of chain 4)

```
<?xml version='1.0' encoding='UTF-8'?>
<Checkbox>false</Checkbox>
```

Chain 2

The chain_2 live message function 2702 may include an input message but no accompanying output message:

```
<?xml version="1.0" encoding="UTF-8"?>
<message xmlns:ns2="http://www.ids-scheer.com/age/common"
xmlns:ns3="http://www.ids-scheer.com/age/process"
xmlns:ns4="http://www.ids-scheer.com/age/um"
xmlns:ns5="http://www.ids-
scheer.com/age/process/def" xmlns:ns6="http://www.ids-
scheer.com/aris/common" xmlns:ns7="http://www.ids-
scheer.com/age/pa/dataaccess">
    <subject/>
    <body>true</body>
    <ads_password>e23fd19759a46423b0a7f198965d5b6f
    </ads_password>
</message>
```

The assign variable function 2704 only does variable assignment:

```
<?xml version='1.0' encoding='UTF-8'?>
<Checkbox>true</Checkbox>
```

The mapping activity 2706 only does variable assignment:

```
<?xml version='1.0' encoding='UTF-8'?>
<Checkbox>true</Checkbox>
```

Chain 3

The chain_3 live message function 2802 may include an input message but no accompanying output message:

```
<?xml version="1.0" encoding="UTF-8"?>
<message xmlns:ns2="http://www.ids-scheer.com/age/common"
xmlns:ns3="http://www.ids-scheer.com/age/process"
xmlns:ns4="http://www.ids-scheer.com/age/um"
xmlns:ns5="http://www.ids-
scheer.com/age/process/def" xmlns:ns6="http://www.ids-
```

```
scheer.com/aris/common" xmlns:ns7="http://www.ids-
scheer.com/age/pa/dataaccess">
    <subject/>
    <body>false</body>
    <ads_password>e23fd19759a46423b0a7f198965d5b6f
    </ads_password>
</message>
```

The mapping activity 2804 does not have any input, output, or variable assignments.

Chain 4

The chain_4 live message function 2902 may include an input message but no accompanying output message:

```
<?xml version="1.0" encoding="UTF-8"?>
<message xmlns:ns2="http://www.ids-scheer.com/age/common"
xmlns:ns3="http://www.ids-scheer.com/age/process"
xmlns:ns4="http://www.ids-scheer.com/age/um"
xmlns:ns5="http://www.ids-
scheer.com/age/process/def" xmlns:ns6="http://www.ids-
scheer.com/aris/common" xmlns:ns7="http://www.ids-
scheer.com/age/pa/dataaccess">
    <subject/>
    <body>truetrue</body>
    <ads_password>e23fd19759a46423b0a7f198965d5b6f
    </ads_password>
</message>
```

The mapping activity 2904 does not have any input, output, or variable assignments.

Figure 30:
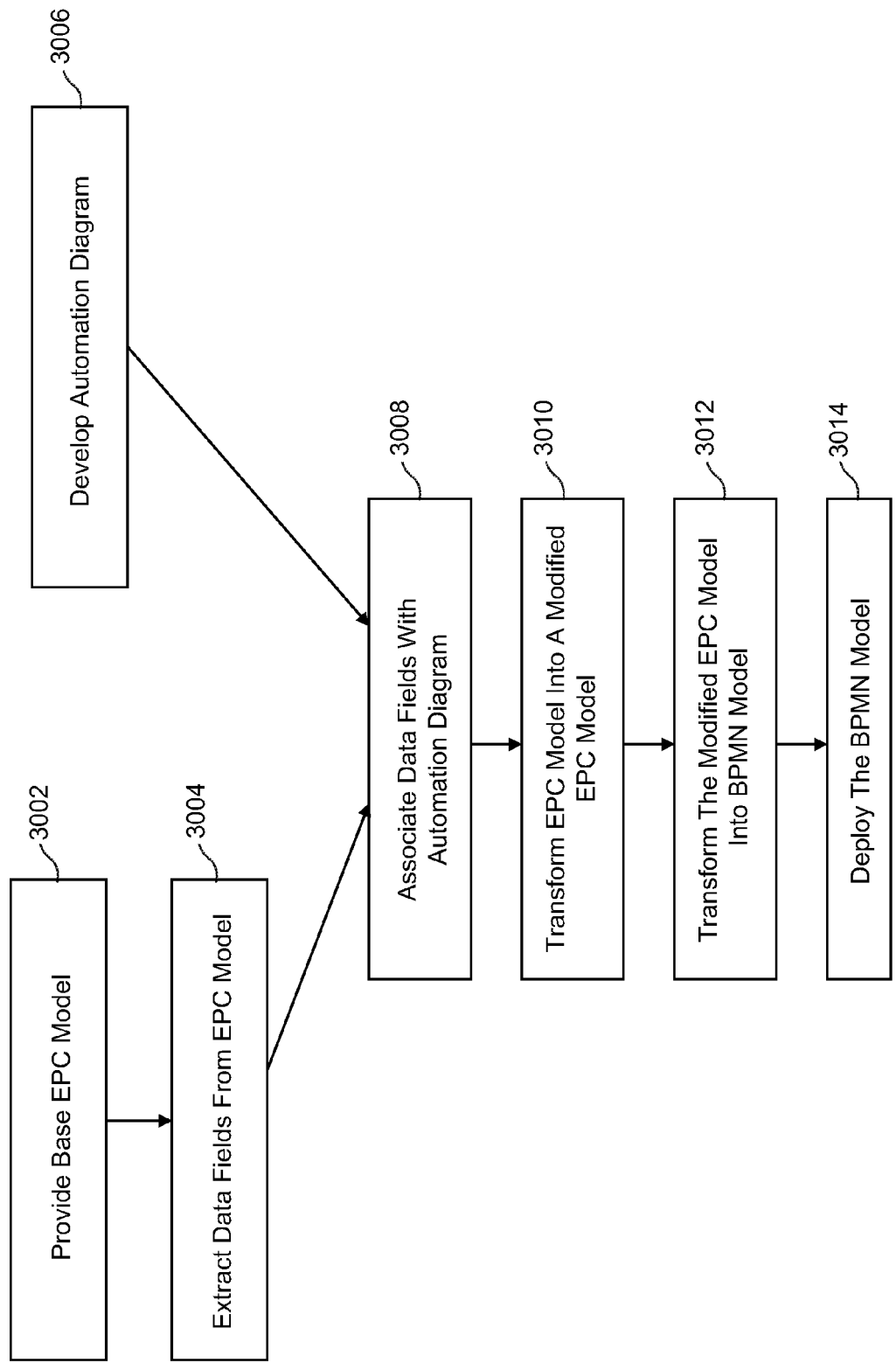
FIG. 30 is an example transformation process for executing a business process according to certain example embodiments.

FIG. 30 is an example transformation process used on a developed business process according to certain example embodiments. A base EPC model is provided in step 3002. Based on the EPC model, data fields are extracted from the EPC model at 3004. The data fields are then associated with an automation diagram in step 3008. The automation diagram is provided from step 3006. In certain example embodiments, the automation diagram is developed prior to, after, or in conjunction with the development of the base EPC model. In certain example embodiments, the generation of the automation diagram is a task assigned to user that generates the automation model independently of an EPC model that is generated. As discussed above, associating the data fields with the automation diagram may enable the data flow of the model (or models) to be better visualized by a user.

In any event, the EPC model and an automation diagram are transformed into EPC in step 3010 in which the automation data flow is inserted into the EPC model. For example, this may be done via a mapping of activities as described herein. As the modified EPC is still in EPC notation, it may now be transformed into BPMN via step 3012. As noted herein, the Applicant for the instant application provides EPC2BPMN (and vice versa) transforms. Once the BPMN transform is complete it may be deployed for use in step 3014.

While the automation diagram described in FIG. 30 is used in conjunction with an EPC model, other implementation may use an automation diagram in conjunction with other notations. For example, a BPMN model may be defined and used with an automation diagram. As with the EPC models, the BPMN model may have data fields associated with the automation diagram and those relationships may be transformed into a modified BPMN model. It will be appreciated that other types of modeling languages may also be used in conjunction with the techniques described herein (e.g., UML, BPEL, or the like).

Figure 31:
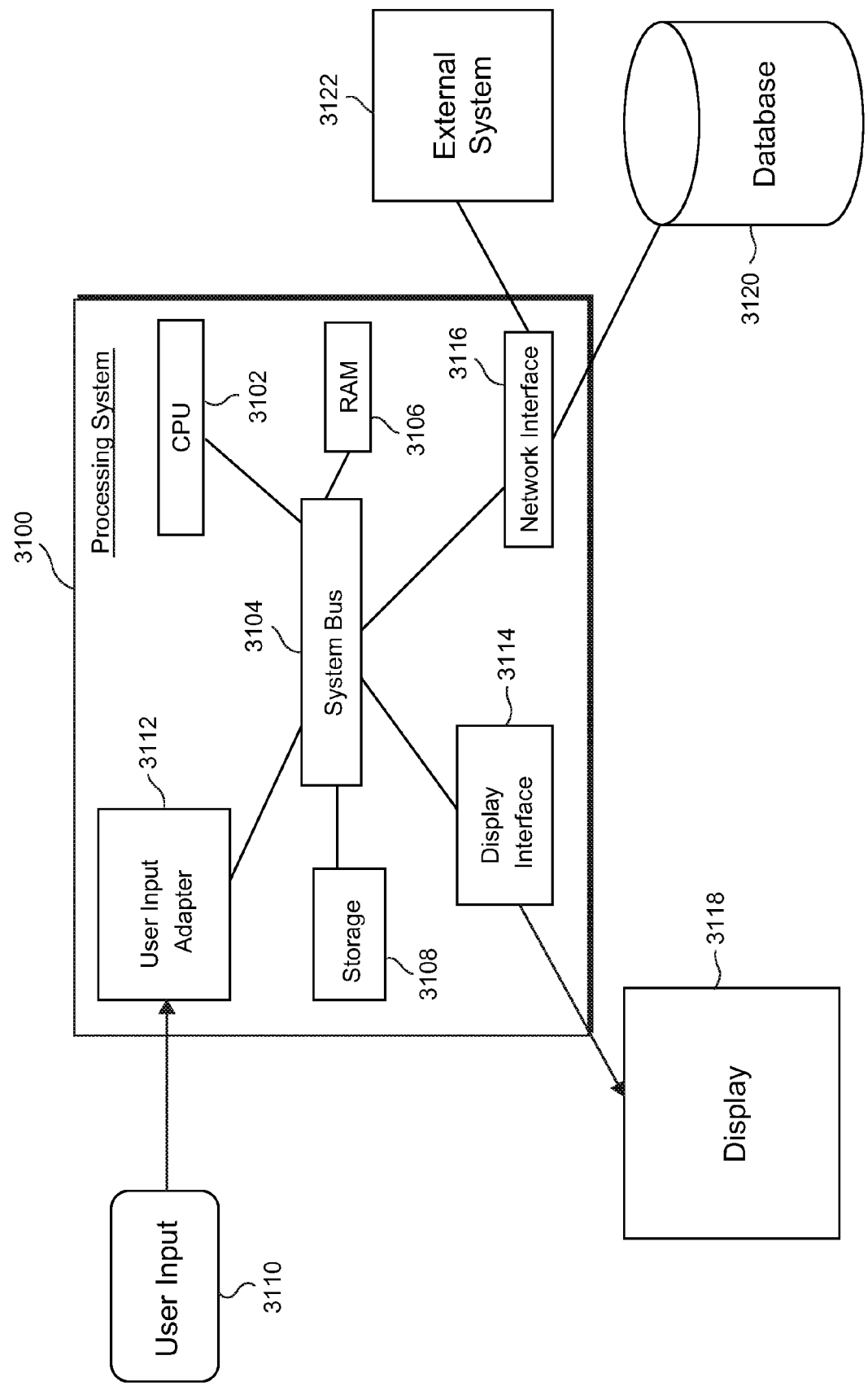
FIG. 31 shows an example processing system according to certain example embodiments.
Figure 32:
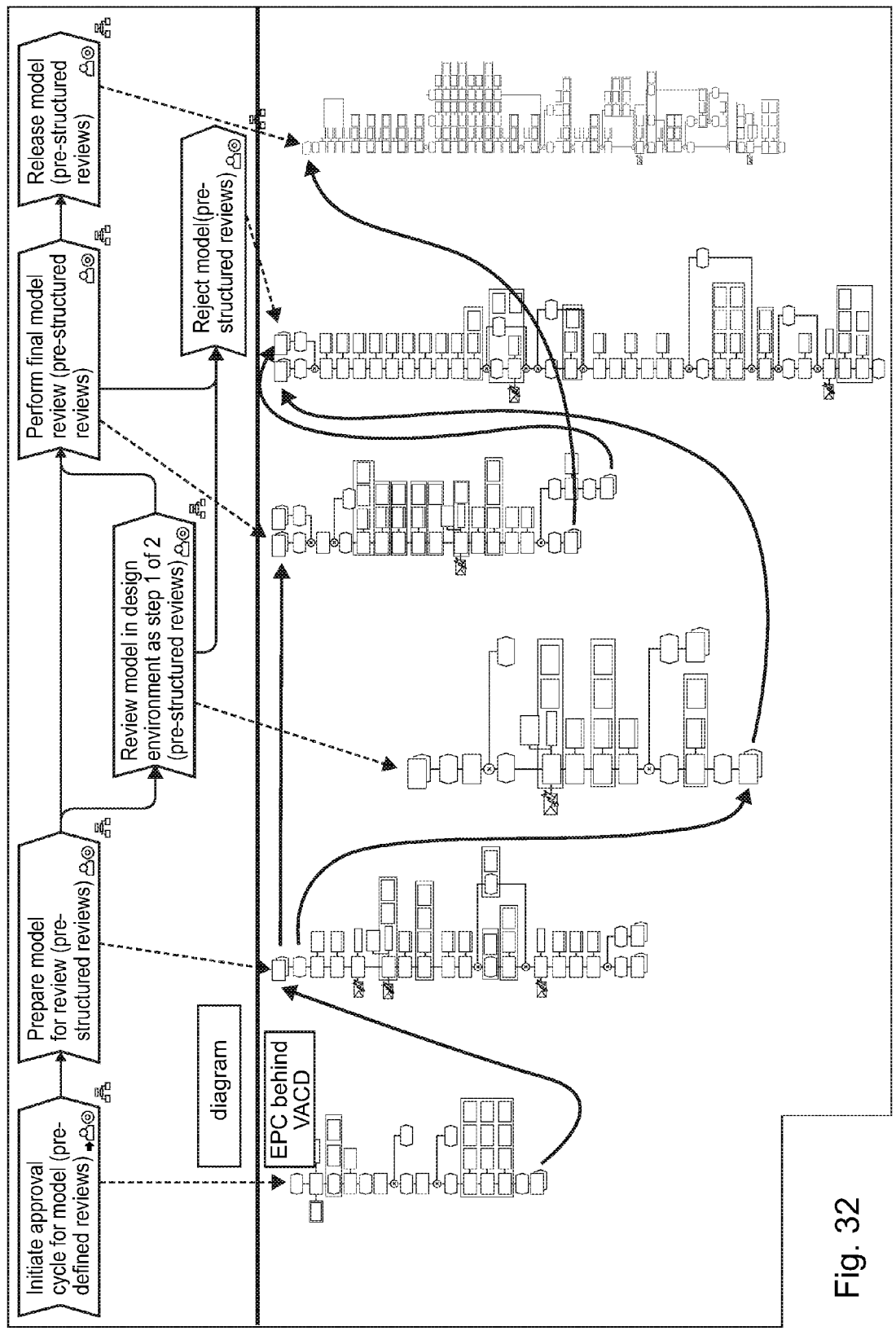
FIG. 32 is an illustration of EPC models associated with a VACD model.

The processes, flow charts, methods, and the like may provide program structure to a processing system. FIG. 31 shows an example processing system according to certain example embodiments. Processing system 3100 may include a central processing unit 3102 that is communicated over a system bus 3104 with a storage medium 3108 that may be non-volatile storage. Random Access Memory (RAM) 3106 (e.g., volatile storage) may be accessible over the system bus 3104. A user input device 3110 such as, for example, a key board, touch pad, mouse, etc. may be provided and communicate with a user input adapter 3112. A display 3118 may be provided to facilitate user interaction with processes that are performed on the processing system 3100. The display 3118 may interact with the processing system through a display interface 3114. The display 3118 may relate the development of processes, their execution, testing, and/or transformation to users. A network interface 3116 may be provided that communicates with a database 3120 and/or an external system 3122. The database 3120 may hold models that are being developed or have already been developed. External systems may include web services or other systems that the processing system 3100 may interact with.

Certain example embodiments, introduce a solution for the flow of data and enhancing data integrity, as well as introducing automation possibilities through linking additional layer (s) of abstraction (e.g., a data flow layer) to other views. In certain example embodiments, the additional layer may includes a new notation (e.g., an automation diagram model) that may be used to improve linking (e.g., by attaching the new abstract layer) to create another dimension to the existing views. While certain example embodiments may use this layer to facilitate the provision of data flow, it will be appreciated that such examples may be used in other contexts. For example, certain example embodiments may provide a method for multi-dimensional linking of abstract layers (that may or may not have a pre-defined relationship) in the BPM world. For example, other layers may be added to layers such as key point monitoring/logging tracking, alerts/event propagation, etc. It will be appreciated that in certain instances a user may not wish to (or simply cannot) put in other layers/flows (e.g., an EPC layer).

Figure 33:
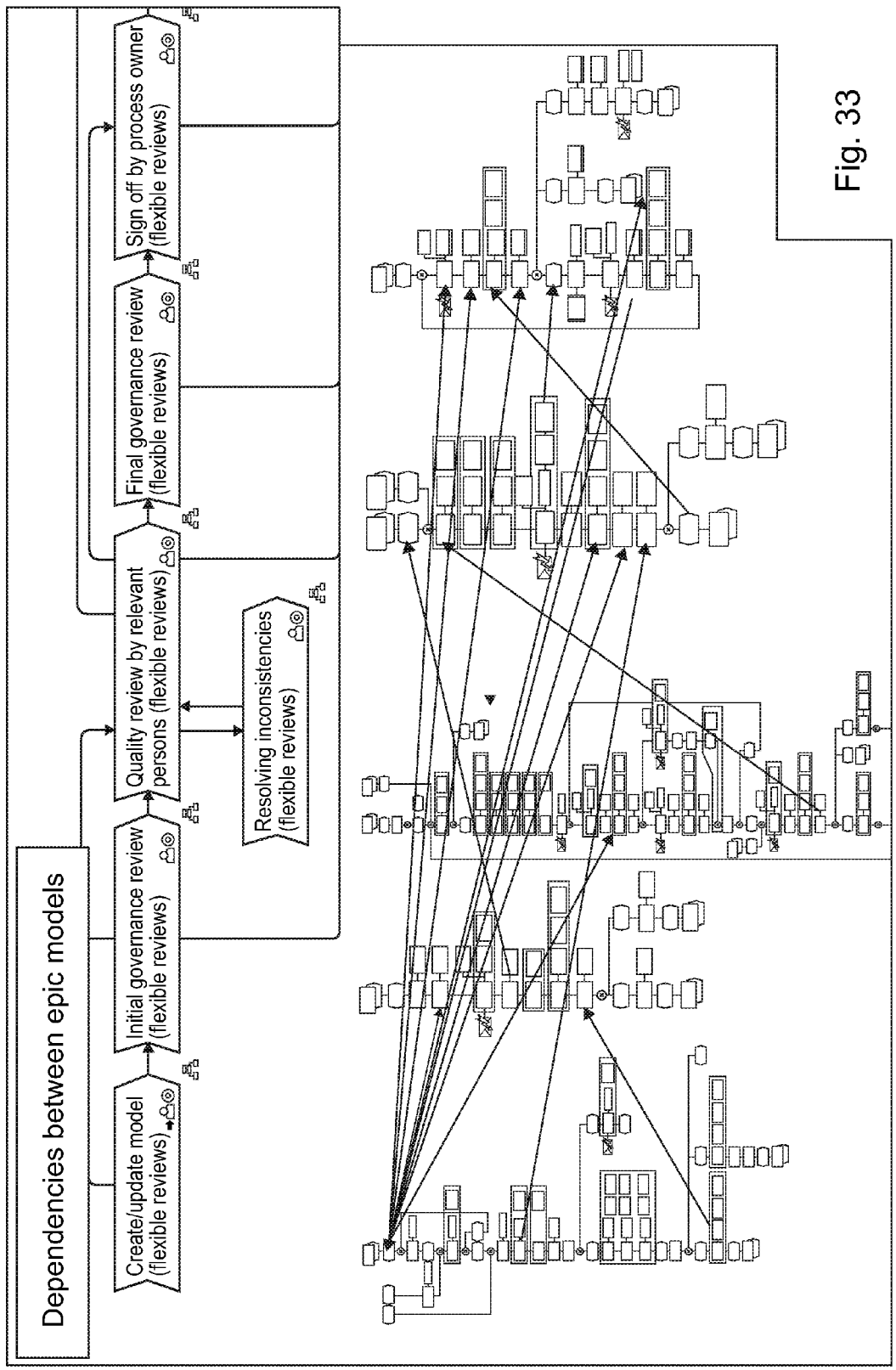
FIG. 33 is an illustration of EPC models showing relationships between data fields of the process in the EPC models.

In certain example embodiments, application of an automation diagram may facilitate more powerful and/or generic solutions for linking complex abstract layers. For example, the data fields shown in FIG. 33 may be transformed in the data flow model shown in FIG. 2 according to certain example embodiments. Although the term "automation diagram" has been used in connection with certain example embodiments, it will be appreciated that this term is not limited strictly to graphical representations of data. Rather, as used herein, an automation diagram refers to a computer-represented "view" or "model" that may or may not be subsequently displayed, provided that it includes the added level of abstraction referred to herein.

Although certain example embodiments have used BPMN and EPC as example models, other example embodiments may use these and/or other models such as, for example, UML, entity relationship, and/or other models.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of linking executable processes to one another, the method comprising:
    providing a base control flow model that includes a plurality of components, at least some of the plurality of components including one or more data fields;
    providing an automation model that includes a plurality of blocks, each one of the plurality of blocks being associated with a partial subset of the base control flow model and including indication(s) of data field(s) associated with the respective partial subset of the base control flow model, wherein each block is also associated with multiple components of the base control flow model, wherein relationships are defined between the blocks for at least some of the indications of the data fields in the blocks of the automation model, wherein the automation model models the flow of data between the respective components associated with corresponding ones of the plurality of blocks; and
    responding to a request to transform the base control flow model to a transformed control flow model by, for each block in the automation model:
        determining which indication(s) of the data field(s) in the block is/are output(s) for the block;
        determining, for each said output, a corresponding input for another one of said blocks;
        generating a new component in the transformed control flow model;
        creating a variable for the new component for each output for the block and for each input to the another one of said blocks;
        associating the created variables with one another to indicate a connection therebetween in accordance with the defined relationships represented in the automation model; and
        injecting the new component into the partial subset associated with the block to thereby generate the transformed control flow model.

2. The method of claim 1, wherein the transformed and base control flow models are business-oriented models associated with a process, business requirement, and/or technical requirement.

3. The method of claim 1, further comprising transforming the transformed control flow model into a technical model.

4. The method of claim 3, wherein the technical model is a Business Process Model and Notation representation.

5. The method of claim 1, wherein the indication(s) of data field(s) of the plurality of blocks define communication between the partial subsets associated with the plurality of blocks.

6. The method of claim 1, wherein there is no communication directly between the partial subsets associated with the plurality of blocks.

7. The method of claim 1, wherein communication between the partial subsets associated with the plurality of blocks is defined exclusively by the indication(s) of data field(s) of the plurality of blocks.

8. The method of claim 1, wherein the new component is injected before the respective partial subset is linked to another partial subset.

9. The method of claim 1, further comprising responding to user provided input to generate the automation model independently of the base control flow model.

10. The method of claim 1, further comprising:
    responding to a user request to automatically generate, without user intervention, a partial automation model that includes indication(s) of data field(s); and
    accepting user input to define the relationships.

11. The method of claim 1, wherein some of the one or more data fields of the at least some components are mandatory data fields and some of the one or more data fields of the at least some components are optional data fields.

12. The method of claim 1, wherein the base control flow model and the transformed control flow model are defined via event-driven process chain notation.

13. The method of claim 1, wherein each block is defined as a functional allocation model.

14. A computer-implemented method of linking executable processes to one another, the method comprising:
    providing a base control flow model that includes a plurality of components, at least some of the plurality of components including one or more data fields;
    providing an automation model that includes a plurality of blocks, each said block in the plurality of blocks being associated with a partial subset of the base control flow model and including indication(s) of data field(s) associated with the respective partial subset of the base control flow model, wherein each block is associated with multiple components of the base control flow model, wherein relationships are defined between the blocks based on at least some of the indications of the data fields in the blocks of the automation model, wherein the automation model models the flow of data between the respective components associated with corresponding ones of the plurality of blocks; and
    responding to a request to transform the base control flow model to a transformed control flow model by, for at least one of the blocks in the automation model:
        generating a new component in the transformed control flow model for the partial subset that is associated with the respective block of the automation model; and
        creating an anchor field in the new component in accordance with the defined relationships represented in the automation model for the respective block.

15. The method of claim 14, wherein the transforming of the base control flow model to a transformed control flow model is performed for each block in the automation model.

16. The method of claim 14, wherein the transforming of the base control flow model to a transformed control flow model further comprises:
    determining which indication(s) of the data field(s) in the block is/are output(s) for the block; and
    determining, for each said output, a corresponding input for another one of said blocks.

17. The method of claim 14, wherein an anchor is created for each output for the block and for each input to the another one of said blocks; and
    wherein the method further comprises associating the created anchor with one another to indicate a connection therebetween in accordance with the defined relationships represented in the automation model.

18. The method of claim 14, further comprising injecting the new component into the partial subset associated with the block.

19. The method of claim 14, wherein the transformed and base control flow models are business-oriented models associated with a process, business requirement, and/or technical requirement.

20. The method of claim 14, further comprising transforming the transformed control flow model into a technical model.

21. The method of claim 14, wherein the indication(s) of data field(s) of the plurality of blocks define communication between the partial subsets associated with the plurality of blocks.

22. The method of claim 14, wherein there is no communication directly between the partial subsets associated with the plurality of blocks.

23. The method of claim 14, wherein communication between the partial subsets associated with the plurality of blocks is defined exclusively by the indication(s) of data field(s) of the plurality of blocks.

24. The method of claim 14, wherein the new component is injected before the respective partial subset is linked to another partial subset.

25. The method of claim 14, further comprising:
responding to a user request to generate the automation model independently of the base control flow model; or
responding to a user request to automatically generate, without user intervention, a partial automation model that includes indication(s) of data field(s), and accepting user input to define the relationships.

26. The method of claim 14, wherein the base control flow model, the automation model, and the transformed control flow model are defined via event-driven process chain notation.

27. The method of claim 14, wherein each block is defined as a functional allocation model.

28. A system for linking executable processes to one another, the system comprising:
a storage medium that is configured to store:
a base control flow model that includes a plurality of components, at least some of the plurality of components including one or more data fields;
an automation model that includes a plurality of blocks, each one of the plurality of blocks being associated with a partial subset of the base control flow model and including indication(s) of data field(s) associated with the respective partial subset of the base control flow model, wherein each block is also associated with multiple components of the base control flow model, wherein relationships are defined between the blocks for at least some of the indications of the data fields in the blocks of the automation model, wherein the automation model models the flow of data between the respective components associated with corresponding ones of the plurality of blocks; and
a processing system that includes at least one processor, the processing system being configured to respond to a request to transform the base control flow model to a transformed control flow model by, for each block in the automation model:
determine which indication(s) of the data field(s) in the block is/are output(s) for the block;
determine, for each said output, a corresponding input for another one of said blocks;
generate a new component in the transformed control flow model;
create a variable for the new component for each output for the block and for each input to the another one of said blocks;
associate the created variables with one another to indicate a connection therebetween in accordance with the defined relationships represented in the automation model; and
inject the new component into the partial subset associated with the block.

29. A non-transitory computer readable storage medium storing instructions for use with a computing system that includes a processing system that includes at least one processor and a storage medium, the stored instructions comprising instructions for implementing the method of claim 1.

30. A computer implemented method of linking segments of a base control flow process model that includes a plurality of components divided among the segments, at least some of the plurality of components including one or more data fields that are associated with input data used when a process associated with the base control flow process is executed, the segments including first and second segments which include first and second components, respectively, the first and second components including first and second data fields, the first and second segments each including multiple components, the method comprising:
creating a base automation model that includes a plurality of blocks, the plurality of blocks including at least a first block and a second block;
defining a plurality of relationships among the plurality of blocks of the base automation model, the defined plurality of relationships including a first relationship between the first block and the second block; and
associating the base automation model with the base control flow process model to create a combined model including:
associating each one of the segments of the base control flow model with a respective one of the plurality of blocks of the base automation model, the first and second segments associated, respectively, with the first and second blocks; and
assigning the first data field to the first relationship and assigning the second data field to the first relationship.

31. The method of claim 30, wherein transitions between the segments of the base control flow process model are defined exclusively by the plurality of relationships.

32. The method of claim 30, wherein the base automation model is created independently of the base control flow process model.

33. A modeling system for linking executable processes to one another, the system comprising:
a storage medium that is configured to store:
a base control flow model that includes a plurality of components, at least some of the plurality of components including one or more data fields;
an automation model that includes a plurality of blocks, each one of the plurality of blocks being associated with a partial subset of the base control flow model and including indication(s) of data field(s) associated with the respective partial subset of the base control flow model, wherein each one of the plurality of blocks is associated with multiple components of the based control flow model, wherein relationships are defined between the blocks for at least some of the indications of the data fields in the blocks of the automation model; and
a processing system that includes at least one processor, the processing system configured to respond to a request to transform the base control flow model to a transformed control flow model by, for at least one of the blocks in the automation model:
  generate a new component in the transformed control flow model for the partial subset that is associated with the respective block of the automation model; and
  create an anchor field in the new component in accordance with the defined relationships represented in the automation model for the respective block.

34. A system for linking segments of a base control flow process model that includes a plurality of components divided among the segments, at least some of the plurality of components including one or more data fields that are associated with input data used when a process associated with the base control flow process is executed, the segments including first and second segments which include first and second components, respectively, the first and second components including first and second data fields, the first and second segments each including multiple components, the system comprising:
  a processing system that includes at least one processor, the processing system configured to:
    create a base automation model that includes a plurality of blocks, the plurality of blocks including at least a first block and a second block;
    define a plurality of relationships among the plurality of blocks of the base automation model, the defined plurality of relationships including a first relationship between the first block and the second block; and
    associate the base automation model with the base control flow process model to create a combined model including:
      associate each one of the segments of the base control flow model with a respective one of the plurality of blocks of the base automation model, the first and second segments associated, respectively, with the first and second blocks; and
      assign the first data field to the first relationship and assign the second data field to the first relationship.

35. A non-transitory computer readable storage medium storing computer readable instructions for use with a processing system that is configured to link segments of a base control flow process model that includes a plurality of components divided among the segments, at least some of the plurality of components including one or more data fields that are associated with input data used when a process associated with the base control flow process is executed, the segments including first and second segments which include first and second components, respectively, the first and second components including first and second data fields, the first and second segments each including multiple components, the stored instructions comprising instructions configured cause the processing system to:
  create a base automation model that includes a plurality of blocks, the plurality of blocks including at least a first block and a second block;
  define a plurality of relationships among the plurality of blocks of the base automation model, the defined plurality of relationships including a first relationship between the first block and the second block; and
  associate the base automation model with the base control flow process model to create a combined model including:
    associate each one of the segments of the base control flow model with a respective one of the plurality of blocks of the base automation model, the first and second segments associated, respectively, with the first and second blocks; and
    assign the first data field to the first relationship and assign the second data field to the first relationship.

* * * * *